United States Patent
Munir et al.

(10) Patent No.: US 10,789,796 B1
(45) Date of Patent: Sep. 29, 2020

(54) PRIORITY-BASED, FACIAL RECOGNITION-ASSISTED ATTENDANCE DETERMINATION AND VALIDATION SYSTEM

(71) Applicant: SUFIAN MUNIR INC., San Diego, CA (US)

(72) Inventors: Sufian Munir, San Diego, CA (US); Farhan Hassan, Islamabad (PK)

(73) Assignee: SUFIAN MUNIR INC, San Diego, CA (US)

( * ) Notice: Subject to any disclaimer, the term of this patent is extended or adjusted under 35 U.S.C. 154(b) by 0 days.

(21) Appl. No.: 16/449,884

(22) Filed: Jun. 24, 2019

(51) Int. Cl.
| G07C 9/00 | (2020.01) |
| G06K 9/00 | (2006.01) |
| G07C 9/25 | (2020.01) |
| G07C 9/21 | (2020.01) |

(52) U.S. Cl.
CPC ......... *G07C 9/257* (2020.01); *G06K 9/00275* (2013.01); *G06K 9/00288* (2013.01); *G07C 9/21* (2020.01)

(58) Field of Classification Search
CPC . G07C 1/10; G07C 9/257; G07C 9/21; G06K 9/00275; G06K 9/00288
USPC .................... 340/5.83; 382/118; 705/32, 326
See application file for complete search history.

(56) References Cited

U.S. PATENT DOCUMENTS

| 9,123,031 | B2 | 9/2015 | Marshall et al. |
| 9,898,647 | B2 | 2/2018 | Velozo et al. |
| 2004/0117638 | A1* | 6/2004 | Monroe ........... G08B 13/19682 713/186 |

(Continued)

FOREIGN PATENT DOCUMENTS

| CN | 107170064 A | 9/2017 |
| CN | 105551104 B | 12/2017 |

(Continued)

OTHER PUBLICATIONS

Yohei Kawaguchi et al.,"Face Recognition-Based Lecture Attendance System", Department of Intelligence Science and Technology, pp. 1-5.

Idelette Laure Kambi Beli et al., "Enhancing Face Identification Using Local Binary Patterns and K-Nearest Neighbors", Imaging, pp. 1-12, Sep. 5, 2017.

(Continued)

*Primary Examiner* — Edwin C Holloway, III
(74) *Attorney, Agent, or Firm* — Barry Choobin; Patent 360 LLC

(57) ABSTRACT

A system and a method perform a priority-based determination of attendance in a target area with minimized processing and computational requirements. The system dynamically generates seat preference information of each attendee of the target area for generating a prioritized attendee scan data set (PASDS) including one or more priority pairs of attendees frequently identified at each seat. The system generates a reduced feature scan data set including one or more distinct features of each attendee in each priority pair and dynamically configures a seat scan order. For each seat in the seat scan order, the system performs rapid facial recognition of the distinct features of each attendee in each priority pair; and based on the recognition, locks occupancy of the current seat by a recognized attendee and dynamically reduces the PASDS for the subsequent seat, or proceeds to scan the subsequent seat, or determines an absentee in the target area.

20 Claims, 17 Drawing Sheets

(56) References Cited

U.S. PATENT DOCUMENTS

| | | | |
|---|---|---|---|
| 2008/0280279 A1* | 11/2008 | Jang | G06Q 10/00 |
| | | | 434/308 |
| 2014/0009496 A1* | 1/2014 | Chapman | G06Q 10/06 |
| | | | 345/636 |
| 2015/0379654 A1 | 12/2015 | Deshmukh et al. | |
| 2016/0055732 A1* | 2/2016 | Howard | G06K 9/3233 |
| | | | 340/539.13 |
| 2018/0285997 A1* | 10/2018 | Bostick | G09B 19/00 |

FOREIGN PATENT DOCUMENTS

| | | |
|---|---|---|
| CN | 108022318 A | 5/2018 |
| CN | 104282049 B | 12/2018 |
| IN | 201741034601 A | 7/2018 |
| JP | 2008250830 A | 10/2008 |

OTHER PUBLICATIONS

Dwi Sunaryono et al., "An Android Based Course Attendance System Using Face Recognition", Journal of King Saud University—Computer and Information Sciences, Jan. 18, 2019.

* cited by examiner

| Historical Seat Preference Information of Seat A ||
|---|---|
| Student | Probability of occupying Seat A |
| Alex | 45% |
| Eric | 40% |
| Ian | 15% |

FIG. 9A

| Historical Seat Preference Information of Seat B ||
|---|---|
| Student | Probability of occupying Seat B |
| Doug | 36% |
| George | 34% |
| Frank | 30% |

FIG. 9B

| Prioritization Attendee Scan Data Set ||
|---|---|
| Priority Pair | Priority |
| Alex or Doug | 1 |
| Alex or George | 2 |
| Alex or Frank | 3 |
| Eric or Ian | 4 |

FIG. 9C

| PRIORITY FACE PAIR | | DECIDING FEATURE |
|---|---|---|
| Alex | Doug | Facial hair or baldness |
| Alex | George | Eyeglasses or hair color |
| Alex | Frank | Facial hair or hair color |
| Eric | Doug | Complexion or facial hair |
| Eric | George | Face shape or hairstyle |
| Eric | Frank | Eyeglasses or complexion or hair |
| Ian | Doug | Eyeglasses or hair |
| Ian | George | Facial hair or eyeglasses |
| Ian | Frank | Complexion |
| Frank | George | Facial hair or eyeglasses |
| Frank | Chuck | Facial hair or hairstyle |

FIG. 10

| Probability (based on first 10 classes attended) |||||||||||
|---|---|---|---|---|---|---|---|---|---|---|
| Seat | Alex | Brian | Chuck | Doug | Eric | Frank | George | Harry | Ian | Empty |
| A | 0% | 0% | 10% | 0% | 0% | 70% | 20% | 0% | 0% | 0% |
| B | 0% | 20% | 0% | 0% | 0% | 10% | 0% | 60% | 10% | 0% |
| C | 30% | 0% | 0% | 40% | 0% | 0% | 30% | 0% | 0% | 0% |
| D | 30% | 0% | 10% | 0% | 0% | 0% | 50% | 10% | 0% | 0% |
| E | 10% | 0% | 40% | 0% | 0% | 20% | 0% | 30% | 0% | 0% |
| F | 0% | 10% | 20% | 10% | 20% | 0% | 0% | 0% | 40% | 0% |
| G | 20% | 20% | 0% | 0% | 10% | 0% | 0% | 0% | 50% | 0% |
| H | 10% | 0% | 20% | 40% | 10% | 0% | 0% | 0% | 0% | 20% |
| I | 0% | 50% | 0% | 0% | 30% | 0% | 0% | 0% | 0% | 20% |
| J | 0% | 0% | 0% | 10% | 30% | 0% | 0% | 0% | 0% | 60% |
| K | 0% | 0% | 0% | 0% | 0% | 0% | 0% | 0% | 0% | 100% |
| L | 0% | 0% | 0% | 0% | 0% | 0% | 0% | 0% | 0% | 100% |

FIG. 11A

| Seat | Probability (based on first 10 classes attended) | | | | | | | | | Probability of identifying one student from the first priority pair | Deviation (total probability of identifying a student / number of students that have occupied that seat in the past) |
|---|---|---|---|---|---|---|---|---|---|---|---|
| | Alex | Brian | Chuck | Doug | Eric | Frank | George | Harry | Ian | Empty | | |
| A | 0% | 0% | 10% | 0% | 0% | 70% | 20% | 0% | 0% | 0% | 90% | 33% |
| B | 0% | 20% | 0% | 0% | 0% | 10% | 0% | 60% | 10% | 0% | 80% | 25% |
| C | 30% | 0% | 0% | 40% | 0% | 0% | 30% | 0% | 0% | 0% | 70% | 33% |
| D | 30% | 0% | 10% | 0% | 0% | 0% | 50% | 10% | 0% | 0% | 80% | 25% |
| E | 10% | 0% | 40% | 0% | 0% | 20% | 0% | 30% | 0% | 0% | 70% | 25% |
| F | 0% | 10% | 20% | 10% | 20% | 0% | 0% | 0% | 40% | 0% | 60% | 20% |

FIG. 11B

| Seat | Probability (based on first 10 classes attended) | | | | | | | | | | Probability of identifying one student from the first priority pair | Deviation (total probability of identifying a student / number of students that have occupied that seat in the past) |
|---|---|---|---|---|---|---|---|---|---|---|---|---|
| | Alex | Brian | Chuck | Doug | Eric | Frank | George | Harry | Ian | Empty | | |
| G | 20% | 20% | 0% | 0% | 10% | 0% | 0% | 0% | 50% | 0% | 70% | 25% |
| H | 10% | 0% | 20% | 40% | 10% | 0% | 0% | 0% | 0% | 20% | 60% | 20% |
| I | 0% | 50% | 0% | 0% | 30% | 0% | 0% | 0% | 0% | 20% | 80% | 40% |
| J | 0% | 0% | 0% | 10% | 30% | 0% | 0% | 0% | 0% | 60% | 40% | 20% |
| K | 0% | 0% | 0% | 0% | 0% | 0% | 0% | 0% | 0% | 100% | 0% | 0% |
| L | 0% | 0% | 0% | 0% | 0% | 0% | 0% | 0% | 0% | 100% | 0% | 0% |

FIG. 11C

PRIORITY-BASED, FACIAL RECOGNITION-ASSISTED ATTENDANCE DETERMINATION AND VALIDATION SYSTEM

BACKGROUND

Technical Field

The system and the method disclosed herein, in general, relate to determining attendance. More particularly, the system and the method disclosed herein relate to performing a priority-based determination and validation of attendance in a target area automatically using facial recognition with minimized processing and computational requirements.

Description of the Related Art

During lectures, seminars, classes, meetings, conferences, etc., in organizations such as educational institutions, corporate offices, etc., determination of attendance is typically required to gauge the number of attendees for different purposes. For example, students are typically required to have a predefined percentage of attendance in a class to be eligible to complete a course or appear for an examination. In a target area, for example, a classroom or a conference room, attendance is typically taken by performing a verbal roll call of names listed in an attendance record to determine whether the listed persons, for example, students, employees, etc., are present or absent. Performing a verbal roll call of multiple attendees and recording the attendance manually based on whether an attendee has confirmed his or her presence is tedious, time consuming, requires a large amount of effort, and reduces time for teaching a class or conducting a meeting.

Some conventional approaches require attendees to sign in an attendance list or scan barcodes, quick-response codes, etc., using their mobile devices to determine participation or attendance in a target area. Other conventional approaches use biometric devices to record attendance. However, students may scan their biometrics, for example, thumb impressions, on the biometric devices provided at an entrance of a classroom but may not enter the classroom. These conventional approaches for determining attendance are, therefore, inefficient in terms of processing time, are low in accuracy, cannot verify the presence of students, and cannot detect proxies used to fraudulently record attendance. Facial recognition can be used to automatically identify faces of attendees in a target area and determine the attendance. However, performing facial recognition for every feature of every face of every attendee, one by one, for every seat in the target area requires substantial processing and computational requirements and is time consuming.

Hence, there is a long-felt need for a system and a method for performing a priority-based determination and validation of attendance in a target area with minimized processing and computational requirements.

SUMMARY

This summary is provided to introduce a selection of concepts in a simplified form that are further disclosed in the detailed description. This summary is not intended to determine the scope of the claimed subject matter.

The system and the method disclosed herein address the above-recited need for performing a priority-based determination and validation of attendance in a target area, for example, a classroom, a conference room, a meeting room, etc., with minimized processing and computational requirements. The method disclosed herein employs a priority-based, facial recognition-assisted attendance determination and validation system (PFRADVS) for performing a priority-based determination and validation of attendance in a target area with minimized processing and computational requirements. The PFRADVS comprises an image capture device, non-transitory, computer-readable storage media operably coupled to the image capture device, at least one processor communicatively coupled to the image capture device and the non-transitory, computer-readable storage media, and one or more modules defining computer program instructions, which when executed by the processor, cause the processor to perform the following steps of the method disclosed herein for performing a priority-based determination and validation of attendance in a target area. The image capture device captures images of the target area comprising multiple seats. The seats comprise seats occupied by one or more of the attendees and unoccupied seats. In an embodiment, various aspects of the method disclosed herein are performed on a client-server system comprising a client device and a server also referred to as an "attendance determination system". The attendance determination system or server utilizes the image capture device and scans of a unique identification code along with artificial intelligence to verify or validate the presence of attendees in the target area. The attendance determination system predicts an attendee's occupancy of a seat based on historical seat preference information and using this historical seat preference information, creates priority pairs to locate attendees on respective seats.

In the method disclosed herein, the attendance determination system dynamically generates and stores seat preference information of each of the attendees of the target area by performing facial recognition on the images of the target area captured by the image capture device over multiple iterations, in communication with a storage device, herein referred to as a "historical information database". The seat preference information comprises, for example, a name of each of the attendees, a seat label associated with each of the seats in the target area, a number of times each of the attendees occupies each of the seats in the target area, a probability of each of the attendees occupying each of the seats in the target area, and a seating arrangement of each session in the target area. The historical information database stores profile information, historical attendance information, and the seat preference information of each of the attendees of the target area, and images of the unoccupied seats in the target area. The profile information comprises, for example, name, images with facial data, age, gender, classes, grade, etc., of each of the attendees. In the method disclosed herein, facial recognition is complemented with historical seat preference information. The attendance determination system determines the attendance of the target area using the dynamically generated and stored seat preference information as follows.

The attendance determination system receives one or more images of the target area comprising multiple seats, from the image capture device. The attendance determination system generates a prioritized attendee scan data set based on the seat preference information. The prioritized attendee scan data set comprises one or more priority pairs of attendees frequently identified at each of the seats. The attendance determination system creates the priority pairs depending upon the historical seat preference information comprising the most frequently found students on a particular seat to minimize the processing power and time for facial recognition and reduces the prioritized attendee scan data set after determination of the presence of each attendee in the target area. The attendance determination system reduces the processing by performing step-by-step facial recognition on the priority pairs of attendees generated based on the historical seat preference information. The attendance determination system dynamically reduces the prioritized attendee scan data set based on a locked occupancy of the seats. The attendance determination system generates a reduced feature scan data set comprising one or more distinct features of each of the attendees in each of the priority pairs of the prioritized attendee scan data set and stores the reduced feature scan data set in the historical information database. The attendance determination system dynamically configures a seat scan order for scanning the seats in the target area using the seat preference information and the prioritized attendee scan data set, in communication with the historical information database. In an embodiment, the attendance determination system computes a deviation on each of the seats using the seat preference information and the prioritized attendee scan data set for the dynamic configuration of the seat scan order.

For each of the seats in the seat scan order: the attendance determination system, in communication with the historical information database, performs facial recognition of the distinct features of each of the attendees in each of the priority pairs of the prioritized attendee scan data set, from the reduced feature scan data set, in an image of a current seat extracted from the received images of the target area; and based on a recognition of one of the attendees in the priority pairs of the prioritized attendee scan data set occupying the current seat, the attendance determination system performs at least one of: locking an occupancy of the current seat by the recognized attendee and dynamically reducing the prioritized attendee scan data set for scanning the subsequent seat in the seat scan order based on the locked occupancy of the current seat, proceeding to scan the subsequent seat in the seat scan order, and determining an absentee in the target area. The attendance determination system dynamically stores a seating arrangement of each session in the target area and the determined attendance of each session in the historical information database for dynamically enhancing or improving the seat preference information and subsequent generation of the prioritized attendee scan data set for each of the seats in the target area over time. In an embodiment, the attendance determination system generates an attendance report comprising the seating arrangement of a session, the attendees occupying the seats, and absentees in the target area, and transmits the attendance report to an entity, for example, the client device, associated with the target area. The generation and dynamic reduction of the prioritized attendee scan data set, the dynamic configuration of the seat scan order, and the performance of rapid facial recognition using the reduced feature scan data set minimize the processing and computational requirements for determining the attendance of the target area.

In an embodiment, the PFRADVS disclosed herein further comprises a client application deployed on the client device. The client application generates a unique identification code configured to facilitate determination of a preliminary attendance of the target area. The unique identification code is, for example, a one-dimensional barcode, or a two-dimensional barcode such as a quick-response (QR) code, or a three-dimensional barcode. The client application receives scans of the unique identification code from user devices of the attendees, compares, in communication with the historical information database, a number of the received scans of the unique identification code with a number of the attendees registered in the target area, and activates the image capture device for capturing the images of the target area to facilitate determination and validation of the attendance of the target area as disclosed above.

In one or more embodiments, related systems comprise circuitry and/or programming for effecting the methods disclosed herein. The circuitry and/or programming can be any combination of hardware, software, and/or firmware configured to effect the methods disclosed herein depending upon the design choices of a system designer. Also, in an embodiment, various structural elements may be employed depending on the design choices of the system designer.

BRIEF DESCRIPTION OF THE DRAWINGS

The foregoing summary, as well as the following detailed description, is better understood when read in conjunction with the appended drawings. For illustrating the system and the method disclosed herein, exemplary constructions of the system and the method disclosed herein are shown in the drawings. However, the system and the method disclosed herein are not limited to the specific components and methods disclosed herein. The description of a component or a method step referenced by a numeral in a drawing is applicable to the description of that component or method step shown by that same numeral in any subsequent drawing herein.

FIGS. 9A-9C exemplarily illustrate tables showing generation of a prioritized attendee scan data set based on seat preference information.

FIG. 10 exemplarily illustrates a table comprising reduced feature scan data sets for performing rapid facial recognition of attendees in a target area with minimized processing and computational requirements.

FIGS. 11A-11C exemplarily illustrate tables showing seat preference information comprising probabilities of attendees being identified on each seat of a target area.

DETAILED DESCRIPTION

Various aspects of the present disclosure may be embodied as a system, a method, or non-transitory computer readable storage media having one or more computer readable program codes stored thereon. Accordingly, various embodiments of the present disclosure may take the form of an entirely hardware embodiment, an entirely software embodiment comprising, for example, microcode, firmware, software, etc., or an embodiment combining software and hardware aspects that may be referred to herein as a "system", a "module", an "engine", a "circuit", or a "unit".

Figure 1:
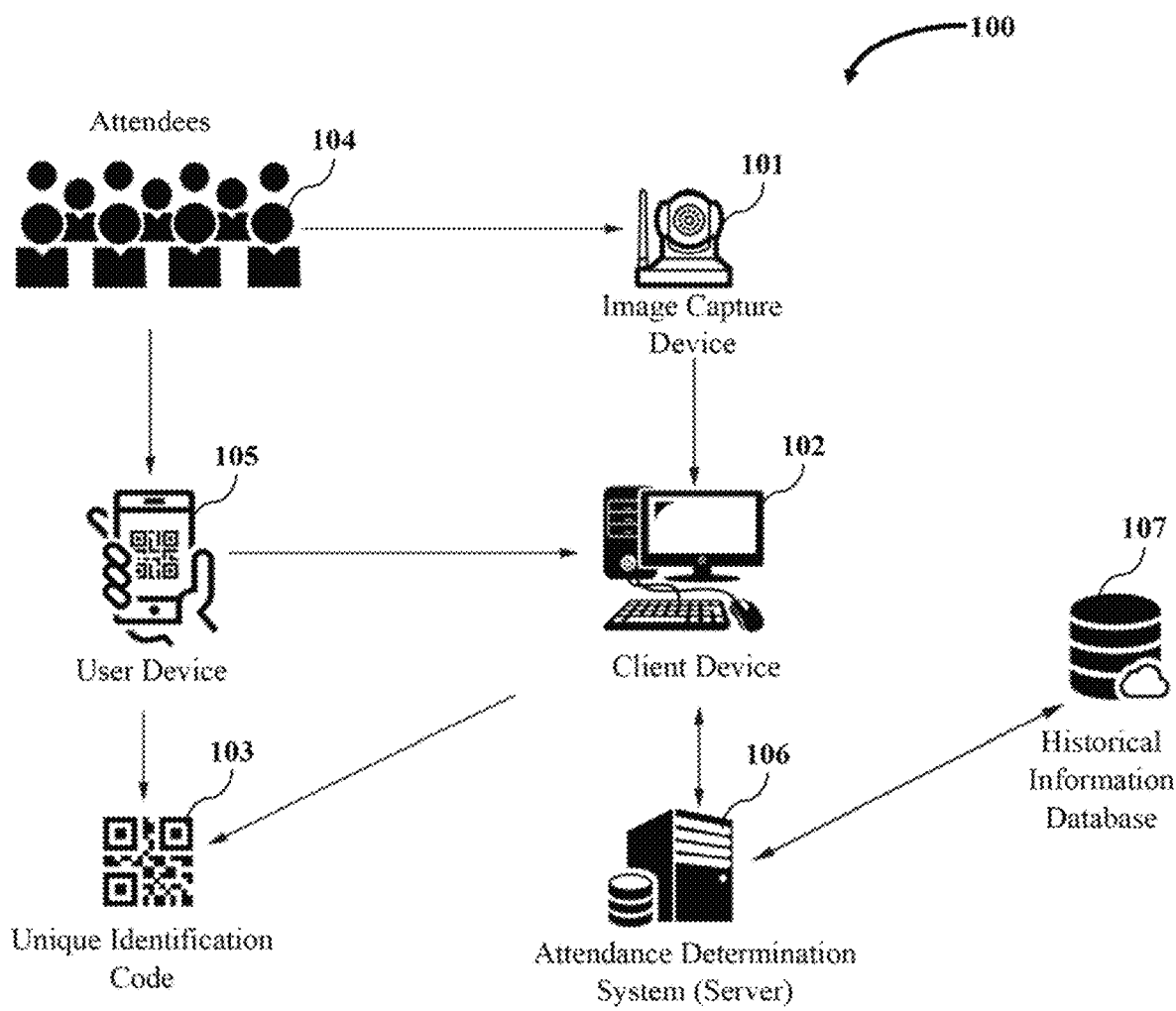
FIG. 1 exemplarily illustrates a priority-based, facial recognition-assisted attendance determination and validation system for performing a priority-based determination and validation of attendance in a target area with minimized processing and computational requirements.

FIG. 1 exemplarily illustrates a priority-based, facial recognition-assisted attendance determination and validation system (PFRADVS) 100 for performing a priority-based determination and validation of attendance in a target area with minimized processing and computational requirements. As used herein, "target area" refers to any region or section reserved for entities, for example, individuals, attendees 104, etc., whose attendance in the region or the section is to be determined. The target area is, for example, a classroom in a school or a college, a meeting room, a conference room, any venue, etc. Also, as used herein, the term "attendees" refers to persons such as students or employees or participants who are registered to attend or be present in a target area. The PFRADVS 100 disclosed herein comprises an image capture device 101 configured to capture images of the target area. As used herein, "image capture device" refers to any electronic or mechanical device, for example, a camera or an image sensor, capable of capturing an image, for example, a photographic image or a video, of a scene using a film or a digital memory. The image capture device 101 comprises one or more cameras for capturing images, for example, still images or moving images, of the target area. The image capture device 101 is, for example, an image sensor, an image recorder, a wireless network camera, a web camera, etc.

In an embodiment, the PFRADVS 100 is implemented as a client-server system comprising a client device 102 and a server 106 also referred to as an "attendance determination system", in addition to the image capture device 101. The client device 102 is an electronic device, for example, one or more of a personal computer, a tablet computing device, a mobile computer, a smart phone, a portable computing device, a laptop, a touch centric device, a workstation, a portable electronic device, a network enabled computing device, an interactive network enabled communication device, any other suitable computing equipment, combinations of multiple pieces of computing equipment, etc. In an embodiment, computing equipment is used to implement applications such as media playback applications, a media viewer, a web browser, a mapping application, an electronic mail (email) application, a calendar application, etc. In an embodiment, the client device 102 is a hybrid device that combines the functionality of multiple devices. In a target area such as a classroom, a supervisor of the target area, for example, a teacher of a class operates the client device 102. In an embodiment, the image capture device 101 is operably coupled to the client device 102. In another embodiment, the image capture device 101 communicates with the client device 102 and the attendance determination system, hereinafter referenced by the numeral 106, via a network, for example, a wired network, or a wireless network, or a combination thereof.

In an embodiment, the PFRADVS 100 further comprises a client application deployed on the client device 102. The client application, executable by at least one processor, is configured to generate a unique identification code 103 configured to facilitate determination of a preliminary attendance of the target area. The unique identification code 103 is, for example, a one-dimensional barcode, or a two-dimensional barcode such as a quick-response (QR) code, or a three-dimensional barcode. In this embodiment, the client device 102 displays the unique identification code 103 generated by the client application on a display unit of the client device 102 or on a display unit operably coupled to the client device 102. The attendees 104 enter the target area and scan the displayed unique identification code 103 using their user devices 105 to record their attendance. The user devices 105 are electronic devices, for example, tablet computing devices, mobile phones, smart phones, laptops, personal digital assistants, handheld devices, wearable devices such as the Google Glass® of Google Inc., the Apple Watch® of Apple Inc., the Android Smartwatch® of Google Inc., etc., touch centric devices, a network enabled computing device, an interactive network enabled communication device, a gaming device, an image capture device, a video recorder, an audio recorder, etc. The user devices 105 of the attendees 104 communicate with the client device 102 via the network. The user devices 105 transmit the scanned images or scans of the unique identification code 103 to the client device 102 via the network.

Figure 2A:
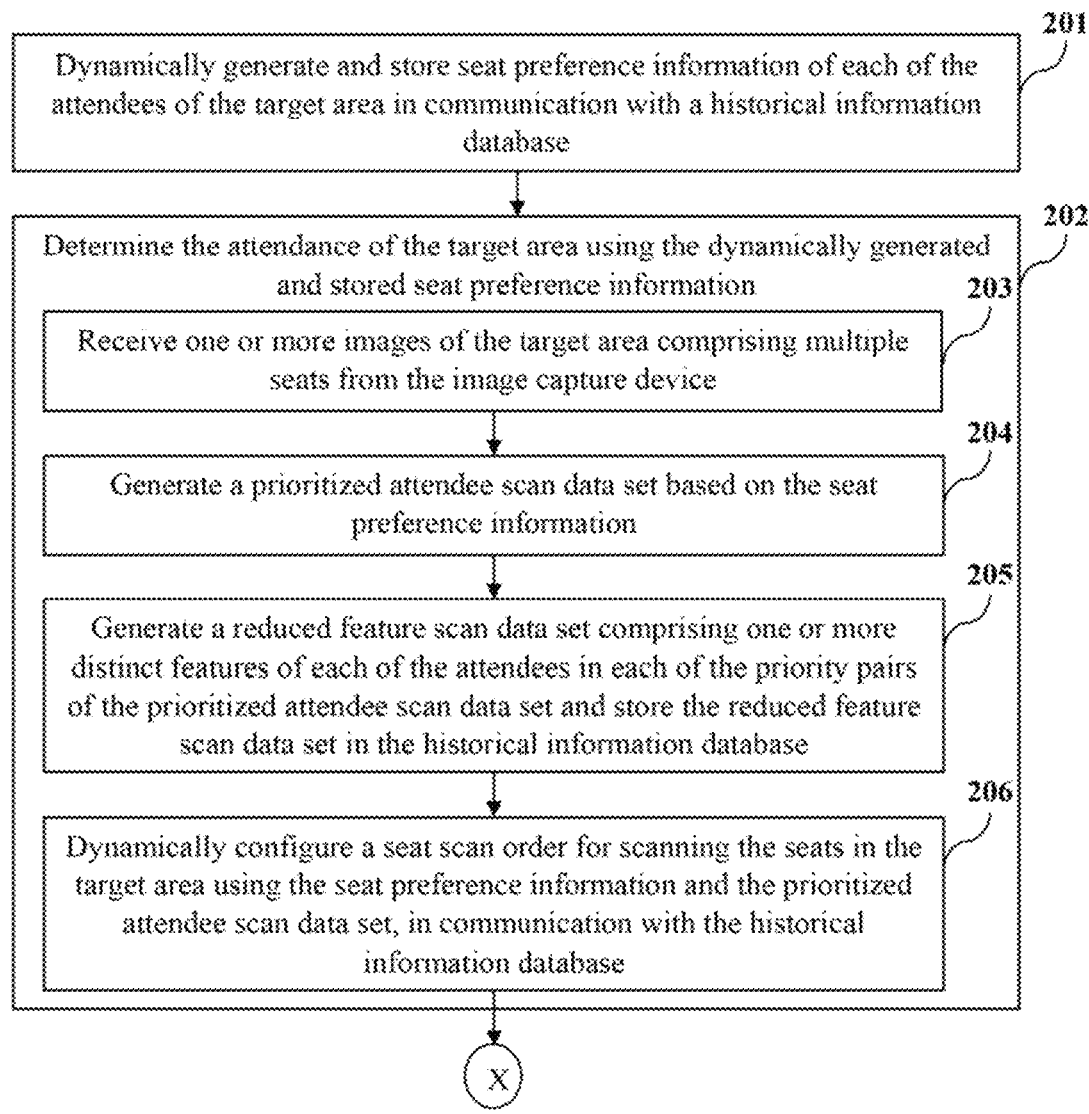
FIGS. 2A-2B illustrate a method for performing a priority-based determination and validation of attendance in a target area with minimized processing and computational requirements.
Figure 2B:
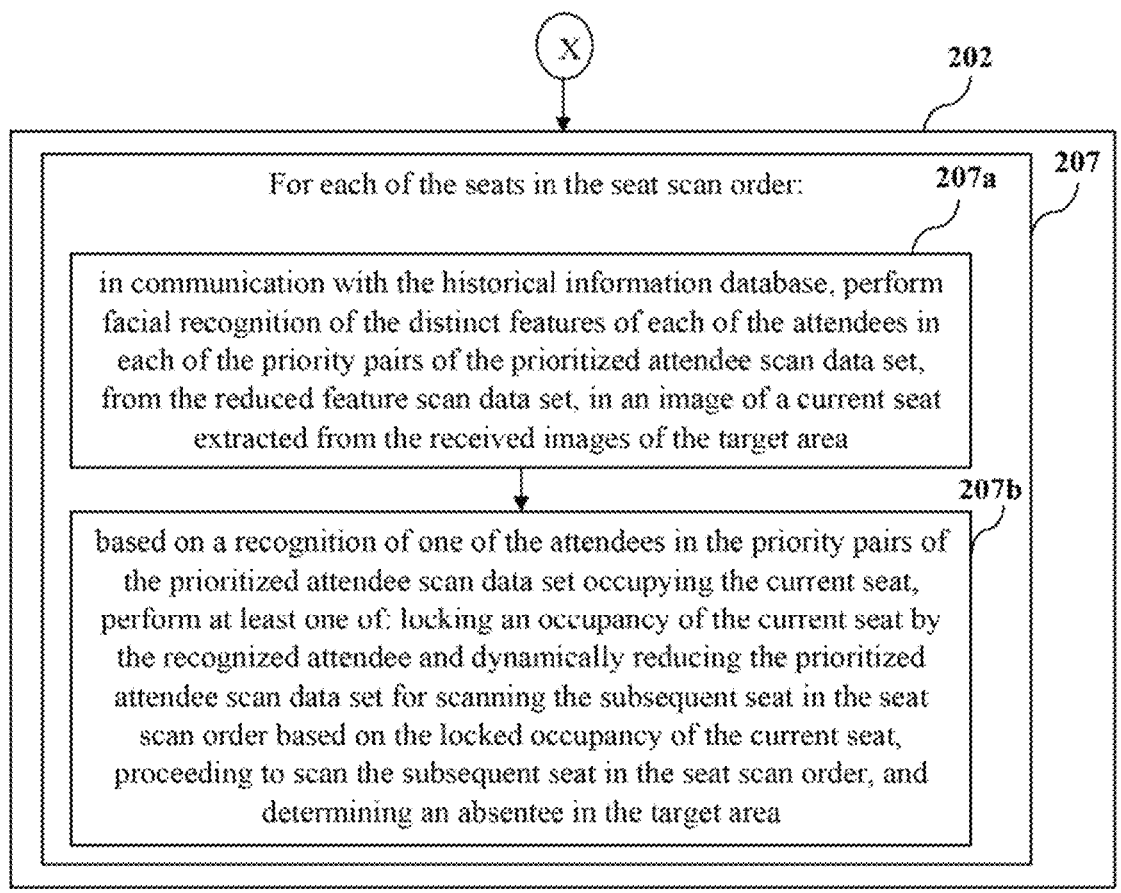

The client application in the client device 102 receives the scans of the unique identification code 103 from the user devices 105 of the attendees 104, compares a number of the received scans of the unique identification code 103 with a number of the attendees 104 registered in the target area, in communication with a storage device, for example, a historical information database 107, and activates the image capture device 101 for capturing images of the target area to facilitate determination and validation of the attendance of the target area as disclosed in the detailed description of FIGS. 2A-2B. The client application deployed on the client device 102 compares the number of scans with the number of registered attendees 104. If the numbers do not match, the client application proceeds to validate the preliminary attendance by performing a detailed determination of the attendance as disclosed in the detailed description of FIGS. 2A-2B. In an embodiment, validation of the preliminary attendance based on the count of the number of scans is performed through facial detection in the image capture device 101.

The client device 102 communicates with the attendance determination system 106 via the network for validating the preliminary attendance. The client device 102 transmits images of the target area captured by the image capture device 101 to the attendance determination system 106 via the network. In an embodiment, the image capture device 101 transmits the captured images to the attendance determination system 106 directly via the network. The attendance determination system 106 stores the captured images in the historical information database 107. The attendance determination system 106 retrieves the captured images and other information comprising, for example, profile information of each of the attendees 104, seat preference information, historical attendance information, etc., from the historical information database 107 for processing and determining attendance in the target area with minimized processing and computational requirements as disclosed in the detailed description of FIGS. 2A-2B. In the PFRADVS 100 disclosed herein, the attendance determination system 106 interfaces with the image capture device 101, the client application on the client device 102, and the historical information database 107 to determine and validate attendance in a target area with minimized processing and computational requirements, and therefore more than one specifically programmed computing system is used for performing a priority-based determination and validation of attendance in a target area with minimized processing and computational requirements.

FIGS. 2A-2B illustrate a method for performing a priority-based determination and validation of attendance in a target area with minimized processing and computational requirements. The method disclosed herein employs the priority-based, facial recognition-assisted attendance determination and validation system (PFRADVS) 100 exemplarily illustrated in FIG. 1, for performing a priority-based determination and validation of attendance in a target area. The image capture device 101 of the PFRADVS 100 exemplarily illustrated in FIG. 1, capture images of the target area. The target area comprises multiple seats including seats occupied by one or more of multiple attendees and unoccupied seats. The image capture device 101 stores the captured images in a local storage location or transmits the captured images to another storage location, for example, to a storage device and/or a client device 102 and/or a server 106 exemplarily illustrated in FIG. 1.

In an embodiment where the PFRADVS 100 is implemented as a client-server system comprising the client device 102 and the attendance determination system or server 106 exemplarily illustrated in FIG. 1, the method disclosed herein employs the attendance determination system 106 for performing a priority-based determination and validation of attendance in a target area with minimized processing and computational requirements. In the method disclosed herein, the attendance determination system 106 dynamically generates and stores 201 seat preference information of each of the attendees of the target area by performing facial recognition on the images of the target area captured by the image capture device 101 over multiple iterations, in communication with a storage device, for example, the historical information database 107 exemplarily illustrated in FIG. 1. As used herein, "seat preference information" refers to information about an attendee and a particular seat where the attendee typically prefers to sit in a target area, which is determined based on the number of times the attendee sits on that particular seat in the target area. The seat preference information comprises, for example, a name of each of the attendees, a seat label associated with each of the seats in the target area such as a seat labeled with a number or an alphabet, a number of times each of the attendees occupies each of the seats in the target area, a probability of each of the attendees occupying each of the seats in the target area, and a seating arrangement of each session in the target area. As used herein, "seating arrangement" refers to an arrangement of attendees seated on respective seats in the target area.

The image capture device 101 continuously captures images and records seat preferences of the attendees during each session in the target area to allow continuous recording of attendance information along with the seating arrangement to dynamically update the seat preference information. The seat preference information is transformed and processed by one or more algorithms executed by the attendance determination system 106 for performing a priority-based determination and validation of the attendance of the target area as disclosed below. The algorithms executed by the attendance determination system 106 use the seat preference information to reduce data sets for image processing and facial recognition and prioritize scanning preferences and a seat scan order, thereby minimizing processing and computational requirements. The attendance determination system 106 stores the dynamically generated seat preference information in the historical information database 107. The attendance determination system 106 uses the dynamically generated seat preference information to identify attendees who are present on their expected seats in the target area. The dynamically generated seat preference information trains the attendance determination system 106 to optimally predict the occupancy of the seats by the attendees with the passage of time.

The historical information database 107 stores profile information, historical attendance information, and the seat preference information of each of the attendees of the target area, and images of the unoccupied seats in the target area. The profile information comprises, for example, name, images with facial data, age, gender, classes, grade, etc., of each of the attendees. In an example, on a day of registration for a class, students register their facial images and other profile information with the PFRADVS 100 for storage in the historical information database 107. The students may utilize the image capture device 101 of the PFRADVS 100 for capturing their facial images. The image capture device 101 transmits the captured facial images of the students to the client device 102 and/or the attendance determination system 106. In an embodiment, the client device 102 transmits the captured facial images received from the image capture device 101 to the attendance determination system 106 via a network, for example, the internet, for storage in the historical information database 107. The historical information database 107 stores information of the students' facial features along with their names and other information, for example, age, gender, classes registered, grade, etc., related to the students. The attendance determination system 106 stores the profile information including the facial data of each student in the historical information database 107. The image capture device 101 also captures images of unoccupied seats in the target area to allow the attendance determination system 106 to analyze and record the unoccupied seats. The images captured by the image capture device 101 are transformed and processed by one or more algorithms executed by the client application in the client device 102 and the attendance determination system 106.

In an example for dynamically generating the seat preference information of each of the students of the classroom, in the start of each class, a teacher or a professor activates the image capture device 101 for capturing images of the classroom. The image capture device 101 transmits the captured image data to the attendance determination system 106 for processing. The attendance determination system 106 performs image processing and facial recognition and determines the students occupying each seat. The attendance determination system 106 performs facial recognition by matching the facial data of the students extracted from the captured image data with the facial data in the profile information of the students who have registered for the class, stored in the historical information database 107. The attendance determination system 106 retrieves the facial data in the profile information of the students from the historical information database 107 for matching. The attendance determination system 106 then stores a seating arrangement of the students based on the facial recognition. The attendance determination system 106 continuously stores the seating arrangement of the students on a daily basis to generate and update the seat preference information. After a few attendances, the attendance determination system 106 starts to determine the probability of a particular student occupying a particular seat against any other student occupying that particular seat. The probability of each of the students occupying a particular seat in a classroom constitutes the seat preference information. The attendance determination system 106 further communicates with the historical information database 107 to retrieve the name of each of the students and a seat label associated with each of the seats in the target area. The attendance determination system 106 associates the name of each of the students, the probability of each of the students occupying a particular seat, and the seat label of that particular seat in a probability chart. The probability chart, therefore, defines the seat preference information.

The attendance determination system 106 determines 202 the attendance of the target area using the dynamically generated and stored seat preference information as follows. The attendance determination system 106 receives 203 one or more images of the target area comprising multiple seats, from the image capture device 101. In an embodiment, the attendance determination system 106 receives the captured images of the target area directly from the image capture device 101 via a network, for example, the internet. In another embodiment, the attendance determination system 106 receives the captured images of the target area from the image capture device 101 via the client device 102. In this embodiment, the image capture device 101 transmits the captured images of the target area to the client device 102 via the network, and the client device 102, in turn, transmits the captured images to the attendance determination system 106 via the network.

Figure 5:
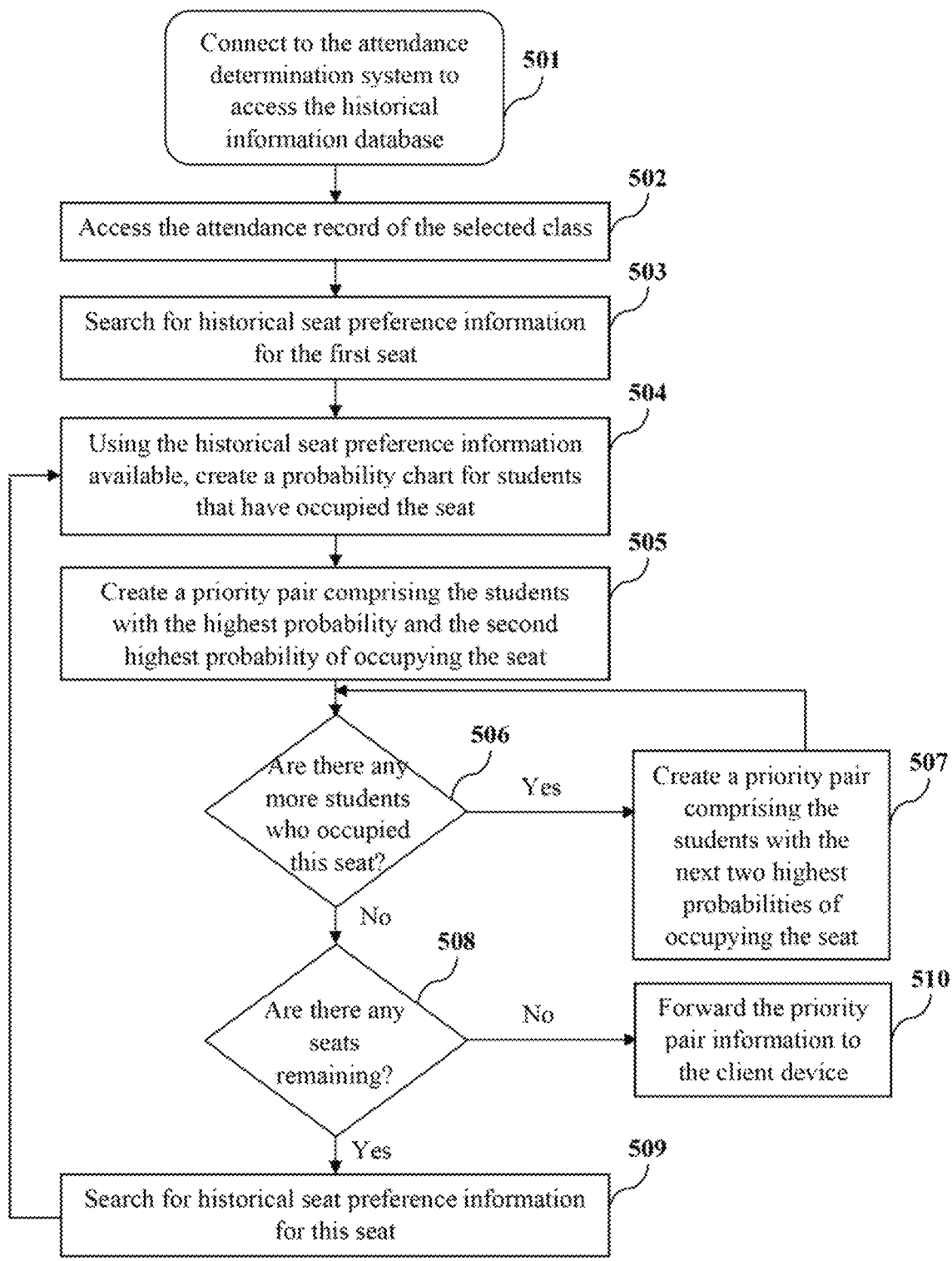
FIG. 5 exemplarily illustrates a flowchart comprising the steps for generating a prioritized attendee scan data set based on seat preference information.

The attendance determination system 106 generates 204 a prioritized attendee scan data set based on the seat preference information as disclosed in the detailed description of FIG. 5. The prioritized attendee scan data set comprises one or more priority pairs of attendees frequently identified at each of the seats. To minimize processing and computational requirements, instead of scanning all the registered attendees for each seat, the attendance determination system 106 generates a prioritized attendee scan data set which is a reduced data set of attendees to be scanned or who will undergo facial recognition for a particular seat. The attendance determination system 106, therefore, prioritizes and scans only those attendees who are more frequently identified on a particular seat. The prioritized attendee scan data set is transformed and processed by one or more algorithms executed by the attendance determination system 106 for generating a reduced feature scan data set, dynamically configuring a seat scan order, and performing improved facial recognition with minimized processing and computational requirements. The prioritized attendee scan data set is dynamically reduced based on a locked occupancy of the seats. To minimize the processing and computational requirements, the attendance determination system 106 reduces the data set of attendees to be scanned as soon as one of the attendees from the prioritized attendee scan data set at a particular seat is recognized and whose occupancy of that particular seat is locked by the attendance determination system 106. The generation of the prioritized attendee scan data set for facial recognition speeds up the process and thus the computational requirements. The prioritized attendee scan data set decreases time required for recognition and identification of an attendee and the computational requirements, thereby facilitating determination of the attendance of the target area in a substantially quicker duration.

Furthermore, the attendance determination system 106 generates 205 a reduced feature scan data set comprising one or more distinct features of each of the attendees in each of the priority pairs of the prioritized attendee scan data set and stores the reduced feature scan data set in the historical information database 107 as disclosed in the detailed description of FIG. 10. To further minimize processing and computational requirements, instead of scanning all the facial features of the attendees in each of the priority pairs of the prioritized attendee scan data set for each seat, the attendance determination system 106 generates a reduced feature scan data set which is a reduced data set of distinct features, for example, complexion, eyeglasses, facial hair, baldness, hair color, hairstyle, etc., to be scanned during facial recognition of the attendees in the priority pairs determined for each seat. The attendance determination system 106 scans for prominent features that are distinct to each attendee in the priority pairs, which quickly identify one face from another. The attendance determination system 106, therefore, prioritizes and scans only those distinct features of the attendees in the priority pairs determined for each seat. The reduced feature scan data set is transformed and processed by one or more algorithms executed by the attendance determination system 106 for performing improved facial recognition with minimized processing and computational requirements. Upon recognition of the distinct features in the reduced feature scan data set, the attendance determination system 106 concludes identification of the attendee being scanned, thereby substantially minimizing processing power and computational requirements. The reduced feature scan data set is a substantially reduced data set in comparison to a database of features of attendees registered in a target area. The generation of the reduced feature scan data set for facial recognition speeds up the process and thus the computational requirements. The reduced feature scan data set decreases time required for recognition and identification of an attendee and the computational requirements, thereby facilitating determination of the attendance of the target area in a substantially quicker duration.

The attendance determination system 106 dynamically configures 206 a seat scan order for scanning the seats in the target area using the seat preference information and the prioritized attendee scan data set, in communication with the historical information database 107. The attendance determination system 106 retrieves the prioritized attendee scan data set comprising one or more priority pairs of attendees frequently identified at each of the seats from the historical information database 107, and the probabilities of each of the attendees occupying each of the seats in the target area from the seat preference information stored in the historical information database 107, to configure the seat scan order as disclosed in the detailed description of FIG. 6. In an embodiment, the attendance determination system 106 computes a deviation on each of the seats using the seat preference information and the prioritized attendee scan data set for the dynamic configuration of the seat scan order as disclosed in the detailed description of FIGS. 11B-11C. The configured seat scan order is transformed and processed by one or more algorithms executed by the attendance determination system 106 for minimizing the processing and computational requirements.

Figure 4A:
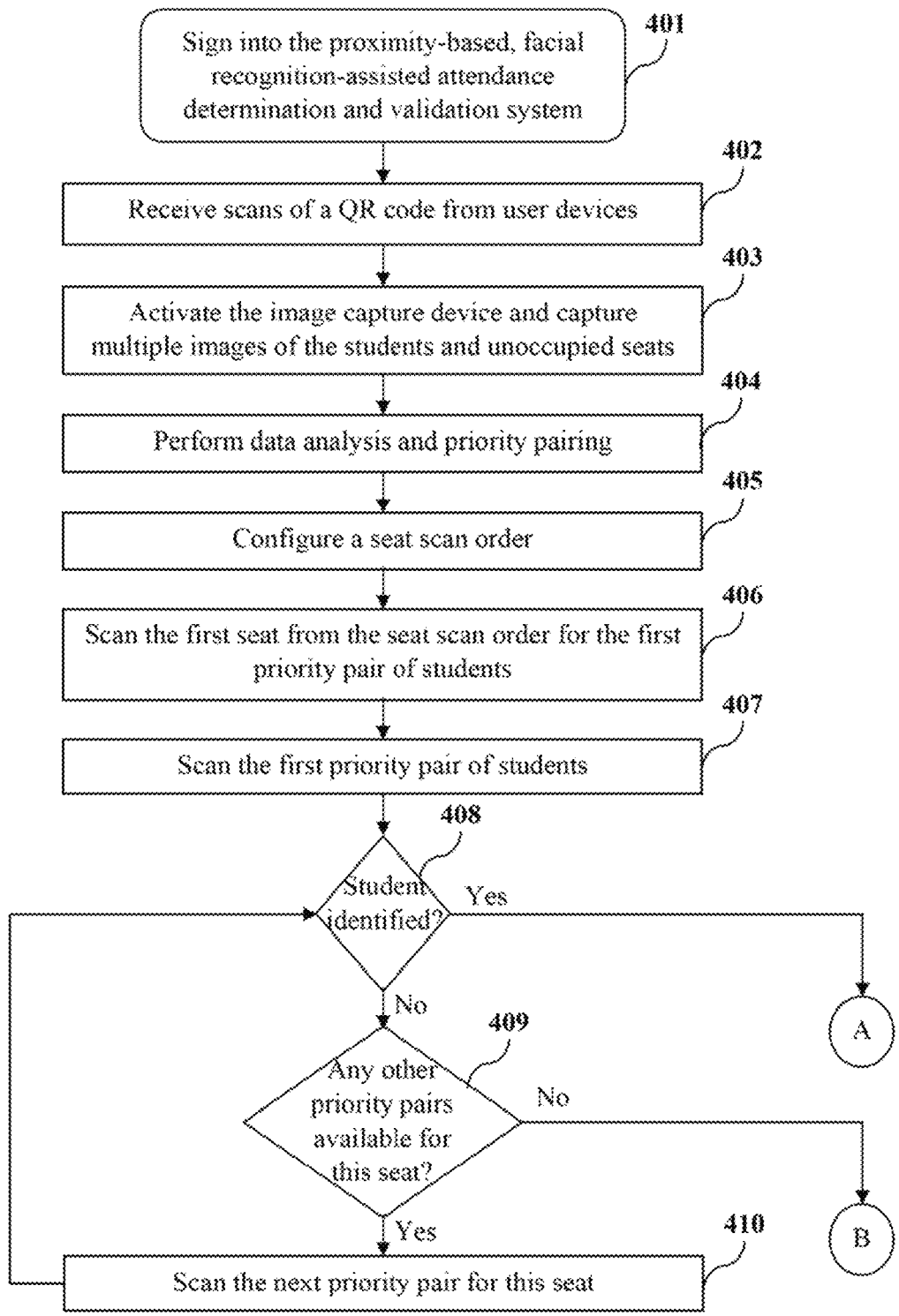
FIGS. 4A-4C exemplarily illustrate a low-level flowchart comprising the steps for performing a priority-based determination and validation of attendance in a target area with minimized processing and computational requirements.
Figure 4B:
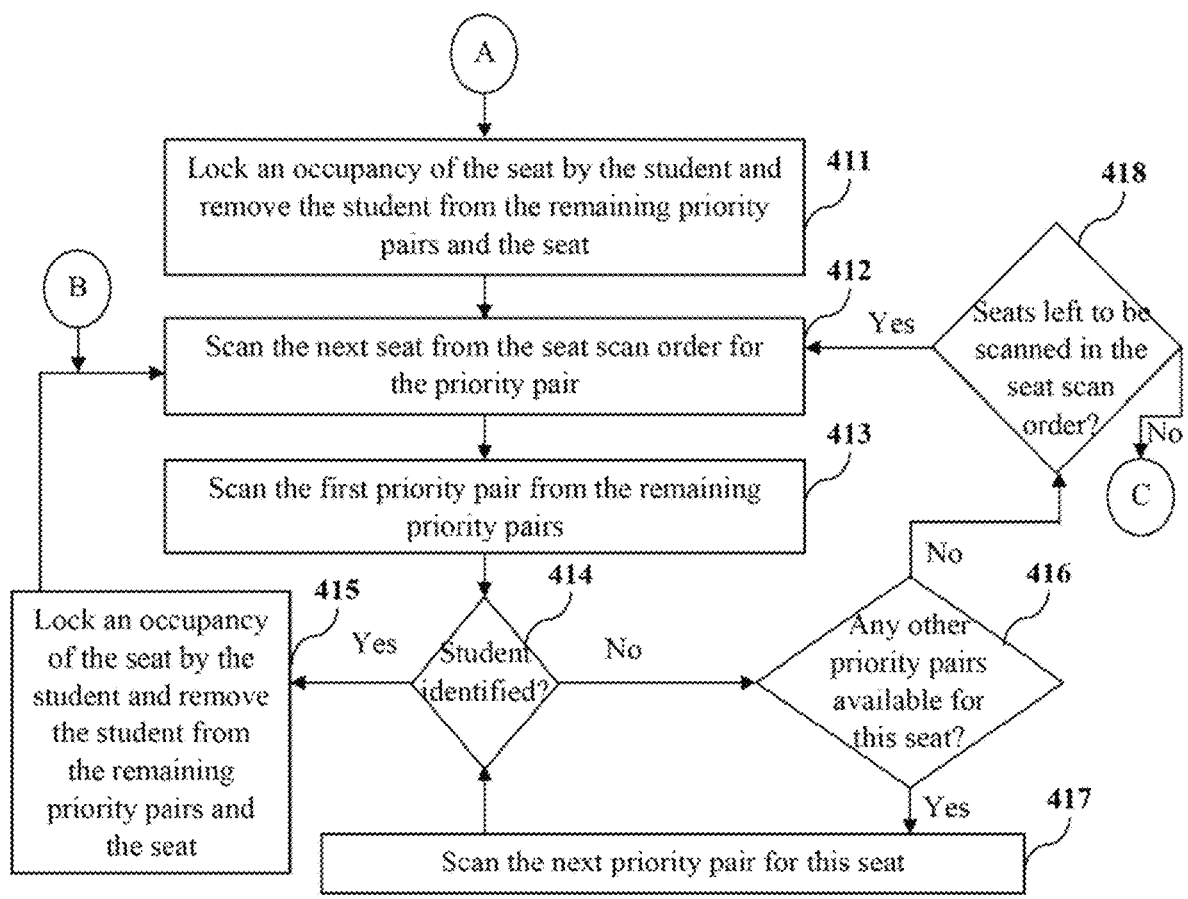
Figure 4C:
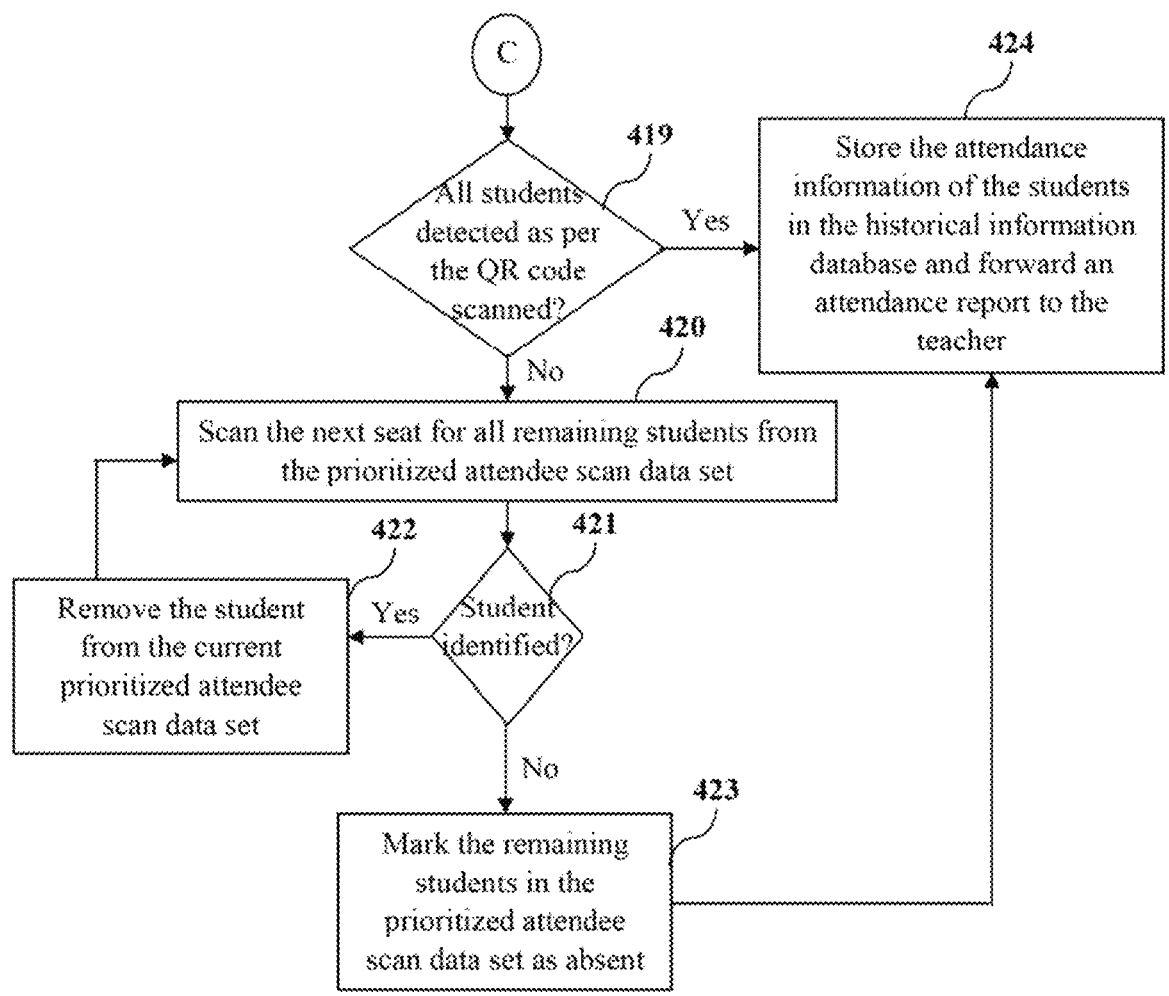

For each of the seats in the seat scan order 207, the attendance determination system 106, in communication with the historical information database 107, performs facial recognition 207a of the distinct features of each of the attendees in each of the priority pairs of the prioritized attendee scan data set, from the reduced feature scan data set, in an image of a current seat extracted from the received images of the target area; and based on a recognition of one of the attendees in the priority pairs of the prioritized attendee scan data set occupying the current seat, the attendance determination system 106 performs 207b at least one of: locking an occupancy of the current seat by the recognized attendee and dynamically reducing the prioritized attendee scan data set for scanning the subsequent seat in the seat scan order based on the locked occupancy of the current seat, proceeding to scan the subsequent seat in the seat scan order, and determining an absentee in the target area as disclosed in the detailed description of FIGS. 4A-4C. In an embodiment, if the attendance determination system 106 identifies an occupied seat, but does not recognize the occupant of the seat, the attendance determination system 106 classifies the occupant as an intruder. In an embodiment, the attendance determination system 106 performs intruder detection, for example, by performing a child versus adult recognition of the occupant of the seat. The attendance determination system 106 dynamically stores a seating arrangement of each session in the target area and the determined attendance of each session in the historical information database 107 for dynamically enhancing or improving the seat preference information and subsequent generation of the prioritized attendee scan data set for each of the seats in the target area over time.

In an embodiment, the attendance determination system 106 generates an attendance report comprising a seating arrangement of a session, the attendees occupying the seats, and absentees in the target area, and transmits the attendance report to an entity, for example, the client device 102, associated with the target area. The attendance report provides a count of the number of attendees present in the target area, an identification of absentees, an identification of unrecognized occupants or intruders, etc. The attendance determination system 106, therefore, validates that the correct persons are present in the target area and are not unrecognized faces, thereby facilitating removal of unauthorized personnel or intruders in the target area. In an embodiment, the attendance determination system 106 stores the attendance report generated each day in the historical information database 107 for future retrieval and to allow maintenance of attendance records of the attendees in the target area. In an embodiment, the attendance determination system 106 generates and transmits alerts to the client device 102 to notify a supervisor of the target area, for example, a teacher, about discrepancies in the attendance. The generation and dynamic reduction of the prioritized attendee scan data set, the dynamic configuration of the seat scan order, and the performance of rapid facial recognition using the reduced feature scan data set minimize the processing and computational requirements for determining the attendance of the target area. The attendance determination system 106 processes data and generates results quickly due to the reduced data sets. A generic computer using a generic program cannot perform a priority-based determination and validation of attendance in a target area with minimized processing and computational requirements in accordance with the method steps disclosed above. The PFRADVS 100 disclosed herein can be used, for example, by teachers in schools and colleges for determining and validating attendance. The PFRADVS 100 disclosed herein can also be used in meetings, conferences, events, etc., where people have registered their facial images and are expected to occupy fixed seats.

Figure 3:
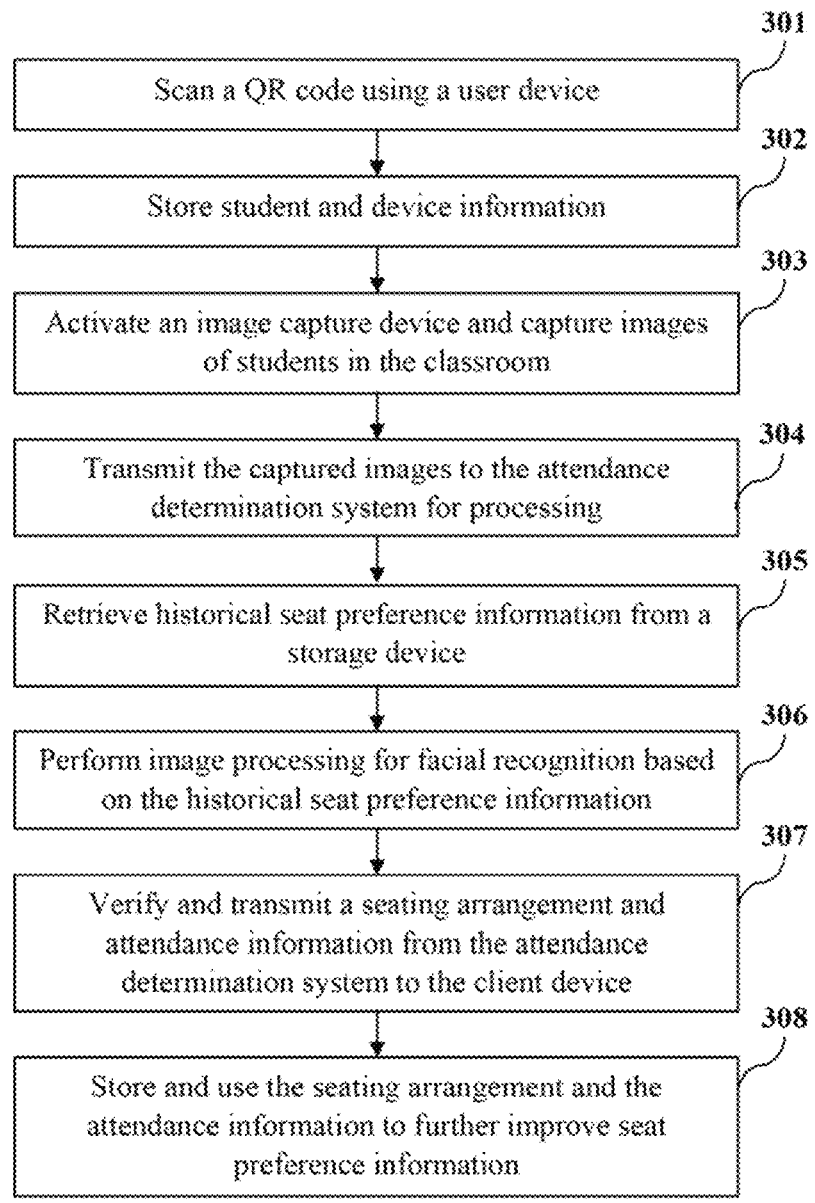
FIG. 3 exemplarily illustrates a high-level flow diagram comprising the steps for performing a priority-based determination and validation of attendance in a target area with minimized processing and computational requirements.

FIG. 3 exemplarily illustrates a high-level flow diagram comprising the steps for performing a priority-based determination and validation of attendance in a target area with minimized processing and computational requirements. In an exemplary implementation, the priority-based, facial recognition-assisted attendance determination and validation system (PFRADVS) 100 disclosed herein caters to a classroom environment and performs cross-verification of students in a classroom by different means, for example, scanning of a unique identification code, facial recognition using reduced data sets, and data matching using the historical information database 107 exemplarily illustrated in FIG. 1, by quickly processing data of multiple students. For purposes of illustration, the detailed description refers to the target area being a classroom where the attendees are students; however, the scope of the PFRADVS 100 exemplarily illustrated in FIG. 1, and the method disclosed herein is not limited to the target area being a classroom, but may be extended to a meeting room, a conference room, or any room or venue where participants or attendees gather and their attendance needs to be determined. The attendance determination system 106 of the PFRADVS 100 exemplarily illustrated in FIG. 1, processes data based on different unique identification codes for different teachers and uses facial recognition on groups of students to identify that correct and authorized students are present in the classroom. Alongside facial recognition, the attendance determination system 106 uses the seat preference information stored in the historical information database 107 to rapidly process image data of the students.

As exemplarily illustrated in FIG. 3, as students enter a classroom, each of the students scans 301 the unique identification code, for example, a quick-response (QR) code, displayed on a display unit in the classroom using their user devices 105 exemplarily illustrated in FIG. 1. The client application deployed on a teacher's client device 102 exemplarily illustrated in FIG. 1, for example, a desktop computer, a tablet computing device, or a workstation, stores 302 student and device information in a client database of the client device 102. The student and device information comprises, for example, the profile information of each of the students and their device data. The teacher or the client device 102 manually or automatically activates 303 the image capture device 101 of the PFRADVS 100 exemplarily illustrated in FIG. 1 and captures images of the students in the classroom. The image capture device 101 transmits 304 the captured images to the attendance determination system 106 for processing directly via the network or via the client device 102 through the network. The attendance determination system 106 retrieves 305 historical seat preference information of each of the students from a storage device, for example, the historical information database 107 exemplarily illustrated in FIG. 1. The attendance determination system 106 then performs 306 image processing for facial recognition of the students occupying the seats in the classroom based on the historical seat preference information as disclosed in the detailed description of FIGS. 4A-4C, to generate a seating arrangement and attendance information. The attendance determination system 106 verifies and transmits 307 the seating arrangement and the attendance information to the client device 102. The attendance determination system 106 stores 308 the seating arrangement and the attendance information in the historical information database 107 and uses the seating arrangement and the attendance information to further update and improve the seat preference information stored in the historical information database 107.

FIGS. 4A-4C exemplarily illustrate a low-level flowchart comprising the steps for performing a priority-based determination and validation of attendance in a target area with minimized processing and computational requirements. Consider an example of a classroom comprising multiple seats to be occupied by students. A teacher in the classroom signs or logs 401 into the priority-based, facial recognition-assisted attendance determination and validation system (PFRADVS) 100 using the client device 102 exemplarily illustrated in FIG. 1. The students enter the classroom, scan the unique identification code, for example, a quick-response (QR) code, displayed on the client device 102 or on a display unit coupled to the client device 102 using their user devices 105, for example, smartphones, exemplarily illustrated in FIG. 1, and transmit the scanned images or scans of the unique identification code from the user devices 105 to the client device 102 via a network, for example, the internet. The client application deployed on the client device 102 receives 402 the scans of the QR code from the user devices 105 via the network. The teacher or the client device 102 automatically activates 403 the image capture device 101, for example, a web camera, of the PFRADVS 100. The image capture device 101 captures 403 multiple images of the students and the seats including unoccupied seats in the classroom. The image capture device 101 transmits the captured images to the attendance determination system or server 106 of the PFRADVS 100 exemplarily illustrated in FIG. 1, directly or via the client device 102 through the network. The attendance determination system 106 generates a prioritized attendee scan data set comprising one or more priority pairs of students frequently identified at each of the seats by performing 404 data analysis and priority pairing as disclosed in the detailed description of FIG. 5. The attendance determination system 106 performs priority pairing to reduce the data set that is to be scanned for each face using the historical seat preference information, which in turn, minimizes the processing and computational requirements for facial recognition. The attendance determination system 106 improves priority pairing over time by storing the seating arrangement and the attendance determined at each session conducted in the target area, for example, the classroom, in the historical information database 107. In an embodiment, the attendance determination system 106 also generates a reduced feature scan data set as disclosed in the detailed description of FIG. 10. The attendance determination system 106, in communication with the historical information database 107 exemplarily illustrated in FIG. 1, configures 405 a seat scan order for scanning the seats in the classroom as disclosed in the detailed description of FIG. 6.

The attendance determination system 106 scans 406 the first seat from the seat scan order for the first priority pair of students. That is, the attendance determination system 106 extracts an image of the first seat from the captured images of the classroom. The attendance determination system 106 scans 407 the first priority pair of students. That is, the attendance determination system 106 retrieves the images of the students in the first priority pair from their profile information stored in the historical information database 107 and compares the retrieved images of the students with the extracted image of the first seat. The attendance determination system 106 scans the first priority pair of students by performing facial recognition of the distinct features of each of the students in the first priority pair in the prioritized attendee scan data set, from the reduced feature scan data set, in the extracted image of the first seat. The attendance determination system 106 determines 408 whether any of the students in the first priority pair is identified or recognized. If any of the students in the first priority pair is not identified, the attendance determination system 106 determines 409 whether any other priority pairs are available in the prioritized attendee scan data set for the first seat. If there are other priority pairs in the prioritized attendee scan data set, the attendance determination system 106 scans 410 the next priority pair for the first seat and proceeds to determine 408 whether any of the students in the next priority pair is identified. If there are no other priority pairs available in the prioritized attendee scan data set for the first seat, the attendance determination system 106 scans 412 the next seat from the seat scan order for the priority pair. If a student is identified, the attendance determination system 106 locks 411 an occupancy of the first seat by the recognized student, removes the recognized student from the remaining priority pairs in the prioritized attendee scan data set, and removes the seat from processing, thereby reducing the prioritized attendee scan data set and minimizing processing and computational requirements.

The attendance determination system 106 then scans 412 the next seat, that is, the second seat, from the seat scan order for the priority pair. The attendance determination system 106 scans 413 the first priority pair from the remaining priority pairs in the reduced prioritized attendee scan data set generated for the second seat. The attendance determination system 106 determines 414 whether any of the students in the first priority pair is identified or recognized. If a student is identified, the attendance determination system 106 locks 415 an occupancy of the second seat by the recognized student and removes the recognized student from the remaining priority pairs in the prioritized attendee scan data set and the seat from processing, thereby reducing the prioritized attendee scan data set and minimizing processing and computational requirements. The attendance determination system 106 then proceeds to scan 412 the next seat from the seat scan order for the priority pair. If any of the students in the first priority pair is not identified, the attendance determination system 106 determines 416 whether any other priority pairs are available for the second seat. If there are other priority pairs in the reduced prioritized attendee scan data set, the attendance determination system 106 scans 417 the next priority pair for the second seat and proceeds to determine 414 whether any of the students in the next priority pair is identified. If there are no other priority pairs available for the second seat, the attendance determination system 106 determines 418 whether there are seats left to be scanned in the seat scan order. If there are seats left to be scanned in the seat scan order, the attendance determination system 106 scans 412 the next seat from the seat scan order for the priority pair and proceeds to perform the steps 413, 414, 415, 416, 417, and 418, until there are no seats left to be scanned in the seat scan order.

If there are no more seats to be scanned in the seat scan order, the attendance determination system 106 determines 419 whether all the students are identified as per the scans of the QR code. If all the students are identified as per the scans of the QR code, the attendance determination system 106 stores 424 the attendance information of the students in the historical information database 107 and forwards the attendance report to the teacher's client device 102. If all the students are not identified as per the scans of the QR code, the attendance determination system 106 scans 420 the next seat for all the remaining students from the reduced prioritized attendee scan data set. The attendance determination system 106 determines 421 whether any of the remaining students is identified or recognized. If any of the remaining students is identified, the attendance determination system 106 removes 422 the student from the current prioritized attendee scan data set and scans 420 the next seat for all the remaining students from the reduced prioritized attendee scan data set. If any of the remaining students is not identified, the attendance determination system 106 marks 423 the remaining students in the prioritized attendee scan data set as absent, stores 424 the attendance information of the students in the historical information database 107, and forwards the attendance report to the teacher's client device 102. The attendance determination system 106 executes the process of determining the attendance and storing the attendance information in every session or class to improve accuracy of the historical seat preference information each time attendance is determined.

FIG. 5 exemplarily illustrates a flowchart comprising the steps for generating a prioritized attendee scan data set based on seat preference information. Consider an example where data analysis and priority pairing are to be performed for determining attendance of students in a classroom comprising multiple seats. In an embodiment, the client device 102 connects 501 to the attendance determination system 106 to access the historical information database 107 as exemplarily illustrated in FIG. 1. Through the client device 102, a teacher of a class may select the class via a graphical user interface (GUI) displayed on the client device 102 to access 502 an attendance record comprising historical seat preference information of the students of the selected class from the historical information database 107. The connected attendance determination system 106 receives the selection of the class from the client device 102 via the network and retrieves the attendance record of the selected class from the historical information database 107 for performing data analysis and priority pairing. The attendance determination system 106 searches 503 for historical seat preference information of the students of the selected class for a first seat in a classroom. Using the historical seat preference information available, the attendance determination system 106 creates 504 a probability chart for students that have occupied the first seat. The attendance determination system 106 creates 505 a priority pair comprising the student with the highest probability of occupying the first seat and the student with the second highest probability of occupying the first seat. The attendance determination system 106 then determines 506 whether there are any more students who occupied the first seat. If there are any more students who occupied the first seat, the attendance determination system 106 creates 507 a priority pair comprising the students with the next two highest probabilities of occupying the first seat and continues to determines 506 whether there are any more students who occupied the first seat. If there are no more students who occupied the first seat, the attendance determination system 106 determines 508 whether there are any seats remaining to be processed in the classroom. If there are seats remaining to be processed in the classroom, the attendance determination system 106 searches 509 for historical seat preference information for the next seat and proceeds to perform the steps 504, 505, 506, 507, 508, and 509 until there are no more seats remaining to be processed in the classroom. If there are no more seats to be processed in the classroom, the attendance determination system 106 generates the prioritized attendee scan data set comprising one or more of the priority pairs of students frequently identified at each of the seats and forwards 510 the prioritized attendee scan data set with the priority pair information to the client device 102.

Figure 6:
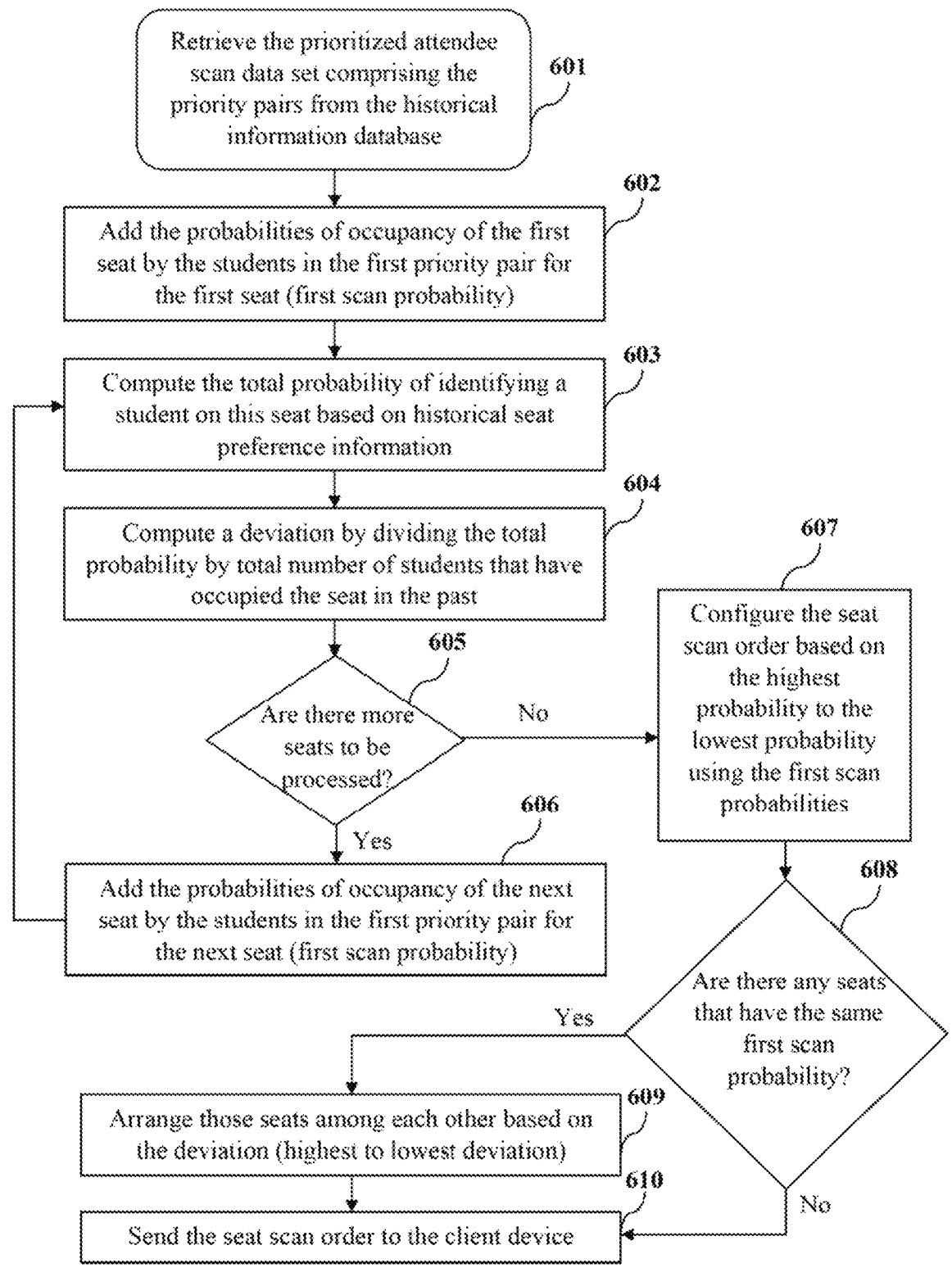
FIG. 6 exemplarily illustrates a flowchart comprising the steps for dynamically configuring a seat scan order for scanning seats in a target area.

FIG. 6 exemplarily illustrates a flowchart comprising the steps for dynamically configuring a seat scan order for scanning seats in a target area, for example, a classroom. The attendance determination system 106 exemplarily illustrated in FIG. 1, retrieves 601 the prioritized attendee scan data set comprising the priority pairs for each of the seats from the historical information database 107 exemplarily illustrated in FIG. 1. The attendance determination system 106 computes a first scan probability by adding 602 the probabilities of occupancy of the first seat by the students in the first priority pair for the first seat as disclosed in the detailed description of FIGS. 11B-11C. The attendance determination system 106 computes 603 the total probability of identifying a student on the first seat based on historical seat preference information as disclosed in the detailed description of FIGS. 11B-11C. The attendance determination system 106 then computes 604 a deviation on each of the seats by dividing the total probability by the total number of students that have occupied the seat in the past. The attendance determination system 106 then determines 605 whether there are more seats to be processed in the classroom. If there are more seats to be processed, the attendance determination system 106 computes a first scan probability by adding 606 the probabilities of occupancy of the next seat by the students in the first priority pair for the next seat and proceeds to performs the steps 603, 604, and 605. If there are no more seats to be processed, the attendance determination system 106 configures 607 the seat scan order by arranging the seats based on the highest probability to the lowest probability using the first scan probabilities.

The attendance determination system 106 then determines 608 whether there are any seats that have the same first scan probability. If there are no seats that have the same first scan probability, the attendance determination system 106 sends 610 the seat scan order to the client device 102 exemplarily illustrated in FIG. 1. If there are any seats that have the same first scan probability, the attendance determination system 106 arranges 609 those seats among each other based on the deviation, that is, highest to the lowest deviation, and then sends 610 the seat scan order to the client device 102.

Figure 7:
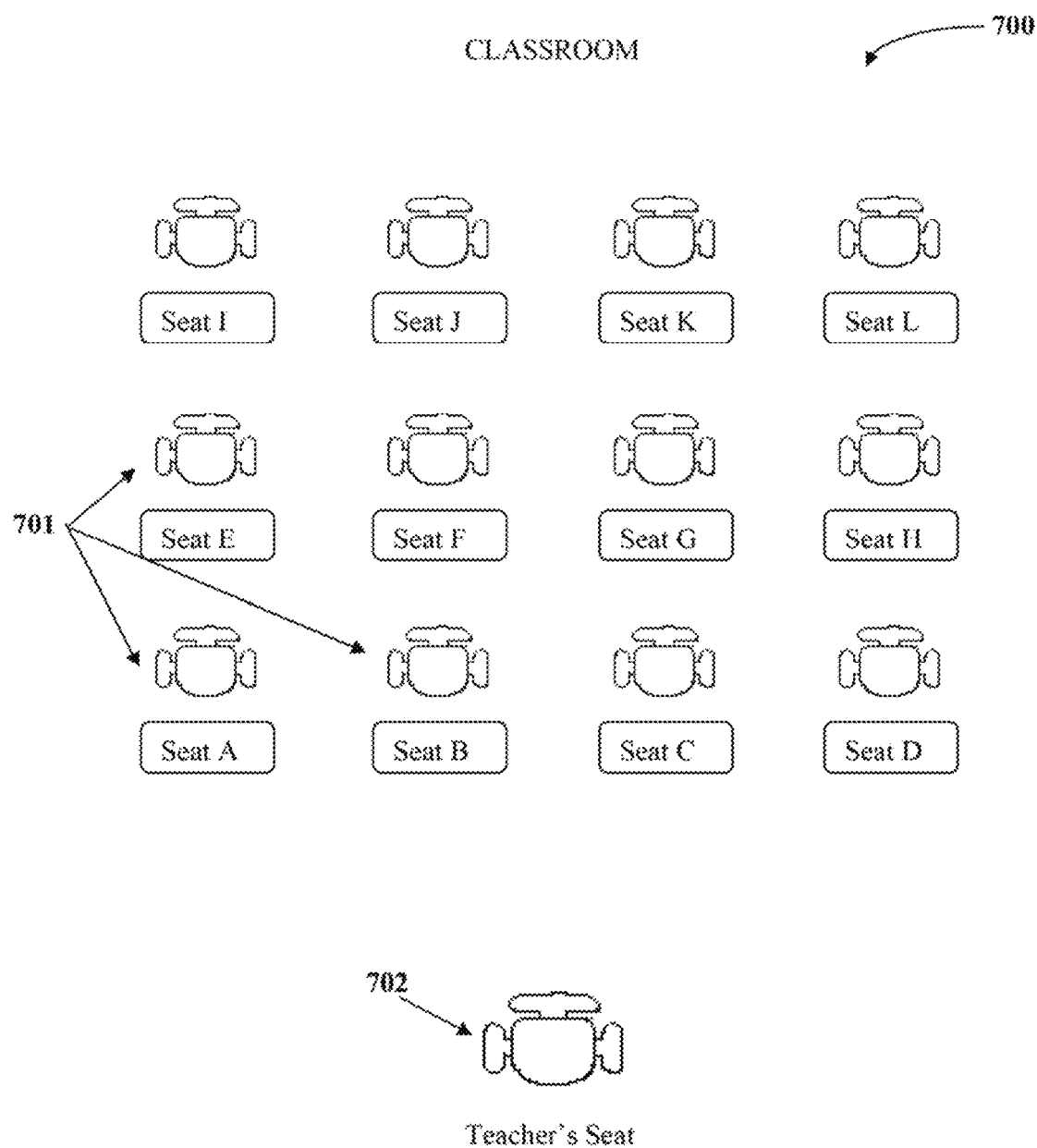
FIG. 7 exemplarily illustrates a target area comprising multiple seats to be scanned for performing a priority-based determination and validation of attendance in the target area with minimized processing and computational requirements.

FIG. 7 exemplarily illustrates a target area comprising multiple seats 701 to be scanned for performing a priority-based determination and validation of attendance in the target area with minimized processing and computational requirements. Consider an example where the priority-based, facial recognition-assisted attendance determination and validation system (PFRADVS) 100 exemplarily illustrated in FIG. 1, is utilized in a target area, for example, a classroom 700 comprising 12 seats 701 labeled A to L facing a teacher's seat 702. The teacher operates the client device 102 that communicates with the image capture device 101 and the attendance determination system 106 as exemplarily illustrated in FIG. 1, in the classroom 700 to determine the attendance of the classroom 700 as disclosed in the detailed descriptions of FIGS. 11A-11C.

Figure 8:
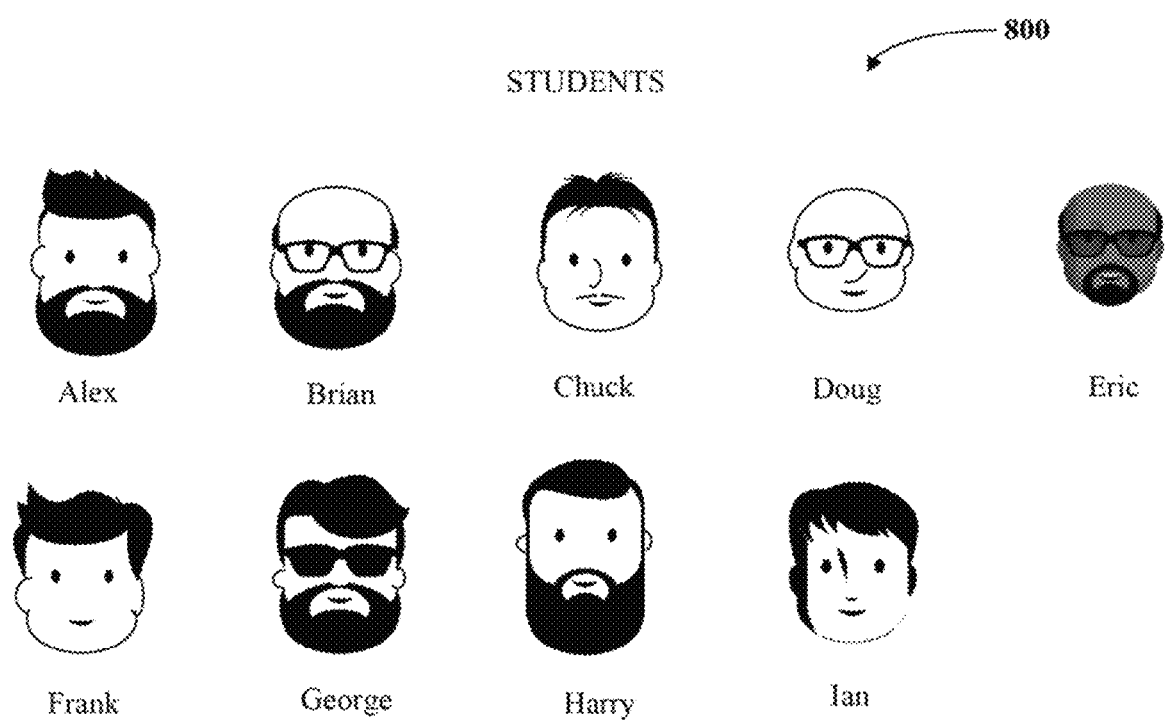
FIG. 8 exemplarily illustrates attendees of a target area to be scanned for performing a priority-based determination and validation of attendance in the target area with minimized processing and computational requirements.

FIG. 8 exemplarily illustrates attendees of a target area to be scanned for performing a priority-based determination and validation of attendance in the target area with minimized processing and computational requirements. In an example, the priority-based, facial recognition-assisted attendance determination and validation system (PFR-ADVS) 100 exemplarily illustrated in FIG. 1, is utilized in a target area, for example, a classroom 700 exemplarily illustrated in FIG. 7, for determining the attendance of students 800 named Alex, Brian, Chuck, Doug, Eric, Frank, George, Harry, and Ian as disclosed in the detailed descriptions of FIGS. 11A-11C.

FIGS. 9A-9C exemplarily illustrate tables showing generation of a prioritized attendee scan data set based on seat preference information. Consider an example where attendance of students 800, namely, Alex, Brian, Chuck, Doug, Eric, Frank, George, Harry, and Ian exemplarily illustrated in FIG. 8, in a classroom 700 exemplarily illustrated in FIG. 7, is to be determined by the priority-based, facial recognition-assisted attendance determination and validation system (PFRADVS) 100 exemplarily illustrated in FIG. 1. One or more of the students 800 enter the classroom 700 and scan a unique identification code, for example, a quick-response (QR) code displayed on a display unit of a teacher's client device 102 using their user devices 105 exemplarily illustrated in FIG. 1. The user devices 105 of the students 800 transmit the scanned images or scans of the QR code to the client device 102 via the network. The client application in the client device 102 receives the scans of the QR code from the user devices 105, compares the number of scans of the QR code with the number of students 800 registered in the classroom 700, in communication with the historical information database 107 exemplarily illustrated in FIG. 1, and activates the image capture device 101 for capturing images of the classroom 700 to facilitate the determination and validation of the attendance of the classroom 700. If the client application determines a mismatch between the number of scans of the QR code and the number of students 800 registered in the classroom 700, in an embodiment, the client application proceeds to validate the preliminary attendance determined using the scans of the QR code by performing a detailed determination of the attendance as disclosed in the detailed description of FIGS. 2A-2B and FIGS. 4A-4C. The client device 102 communicates with the attendance determination system 106 exemplarily illustrated in FIG. 1, via the network. The client device 102 transmits images of the classroom 700 captured by the image capture device 101 to the attendance determination system 106 via the network.

In an example, on a particular day, the attendance determination system 106 processes the captured images of the classroom 700 and determines that seat B in the classroom 700 is empty or unoccupied. Furthermore, the client application in the client device 102 determines that 9 QR codes were scanned but only 8 students are present in the classroom 700 by scanning the seats for occupancy. The client device 102 transmits the information on the mismatch to the attendance determination system 106 via the network to trigger facial recognition by the attendance determination system 106. The attendance determination system 106 retrieves the seat preference information exemplarily illustrated in FIGS. 9A-9B, comprising the probabilities of students occupying seat A and seat B from the historical information database 107. From the seat preference information, the attendance determination system 106 determines the probabilities of Alex, Eric, and Ian occupying seat A as 45%, 40%, and 15% respectively. Furthermore, the attendance determination system 106 determines the probabilities of Doug, George, and Frank occupying seat B as 36%, 34%, and 30% respectively. In an embodiment, the attendance determination system 106 generates the prioritized attendee scan data set comprising the priority pairs for seat B in the following prioritization order: (1) Alex or Doug; (2) Alex or George; (3) Alex or Frank; and (4) Eric or Ian as exemplarily illustrated in FIG. 9C. In the first 3 iterations of facial recognition, the attendance determination system 106 identifies whether Alex, Doug, George, Frank, Eric, or Ian are occupying seat B. If the attendance determination system 106 does not identify Alex, Doug, George, Frank, Eric, or Ian on seat B, the attendance determination system 106 proceeds to scan the remaining students, namely, Brian, Chuck, and Harry to determine whether they are identified on seat B. When the attendance determination system 106 identifies a student on seat B, the attendance determination system 106 removes that student from the prioritized attendee scan data set and proceeds to scan the remaining seats in the classroom 700 using the reduced prioritized attendee scan data set.

FIG. 10 exemplarily illustrates a table comprising reduced feature scan data sets for performing rapid facial recognition of attendees in a target area with minimized processing and computational requirements. For minimizing the processing and computational requirements, in addition to generating and dynamically reducing a prioritized attendee scan data set, the attendance determination system 106 exemplarily illustrated in FIG. 1, also generates a reduced feature scan data set comprising one or more distinct features of each of the students in each of the priority pairs of the prioritized attendee scan data set and stores the reduced feature scan data set in the historical information database 107 exemplarily illustrated in FIG. 1. Consider an example where the attendance determination system 106 generates the following priority pairs of faces of the students 800 in the classroom 700 exemplarily illustrated in FIGS. 7-8: Alex or Doug, Alex or George, Alex or Frank, Eric or Doug, Eric or George, Eric or Frank, Ian or Doug, Ian or George, Ian or Frank, Frank or George, and Frank or Chuck as exemplarily illustrated in FIG. 10. The attendance determination system 106 generates a data set of distinct or deciding features in each of the priority pairs to facilitate scanning of only the distinct features during facial recognition, thereby minimizing the processing and computational requirements. Rather than scanning the entire features of each face, the attendance determination system 106 generates features distinct to each face to decide between the students in each priority pair. The attendance determination system 106, therefore, substantially minimizes the processing and computational requirements as facial recognition is being performed over a minimum number of features to identify a student. As exemplarily illustrated in FIG. 10, the distinct feature is, for example, facial hair or baldness for the priority pair Alex or Doug; eyeglasses or hair color for the priority pair Alex or George; facial hair or hair color for the priority pair Alex or Frank; complexion or facial hair for the priority pair Eric or Doug: face shape or hairstyle for the priority pair Eric or George; eyeglasses or complexion or hair for the priority pair Eric or Frank; eyeglasses or hair for the priority pair Ian or Doug; facial hair or eyeglasses for the priority pair Ian or George; complexion for the priority pair Ian or Frank, facial hair or eyeglasses for the priority pair Frank or George: and facial hair or hairstyle for the priority pair Frank or Chuck. In communication with the historical information database 107, the attendance determination system 106 performs facial recognition of the distinct feature of each of the students in each of the priority pairs in an image of each seat in the seat scan order, extracted from the images of the classroom 700 in a quicker duration.

FIGS. 11A-11C exemplarily illustrate tables showing seat preference information comprising probabilities of attendees being identified on each seat of a target area. Consider an example where the priority-based, facial recognition-assisted attendance determination and validation system (PFR-ADVS) 100 comprising the image capture device 101, the client device 102, the attendance determination system 106, and the historical information database 107 exemplarily illustrated in FIG. 1, is utilized in a target area, for example, a classroom 700 comprising 12 seats 701 labeled A to L facing a teacher's seat 702 exemplarily illustrated in FIG. 7, for determining the attendance of students 800 named Alex, Brian, Chuck, Doug, Eric, Frank, George, Harry, and Ian exemplarily illustrated in FIG. 8. The image capture device 101 captures multiple images of the classroom 700. FIG. 11A exemplarily illustrates a table showing a probability chart constituting the seat preference information based on 10 classes conducted in the classroom 700 and attended by the students 800. The attendance determination system 106 executes machine learning from the first class conducted in the classroom 700. In this example, after about 10 classes, the attendance determination system 106 determined that Frank was identified on seat A seven times, whereas George was identified on seat A two times, and Chuck was identified on seat A one time. The attendance determination system 106, therefore, determines the probability of identifying Frank on seat A as 70%, the probability of identifying George on seat A as 20%, and the probability of identifying Chuck on seat A as 10% based on the attendance of 10 classes as exemplarily tabulated in FIG. 11A. Similarly, the attendance determination system 106 determined that Harry was identified on seat B six times, whereas Brian was identified on seat B two times, and Frank and Ian, each were identified on seat B one time. The attendance determination system 106, therefore, determines the probability of identifying Harry on seat B as 60%, the probability of identifying Brian on seat B as 20%, and the probability of identifying Frank and Ian, each on seat B as 10% based on the attendance of 10 classes as exemplarily tabulated in FIG. 11A. Similarly, the attendance determination system 106 determines the probabilities of identifying each of the students 800 on the seats labeled C to L and the probabilities of identifying the seats 701 A to L empty or unoccupied and generates the probability chart exemplarily illustrated in FIG. 11A. The attendance determination system 106 stores the generated probability chart in the historical information database 107.

The attendance determination system 106 generates priority pairs that constitute the prioritized attendee scan data set for each seat based on the attendance and the seat preference information retrieved from the historical information database 107. The attendance determination system 106, therefore, prioritizes the scanning of the students that are more frequently identified on a particular seat. In an embodiment, the attendance determination system 106 performs the facial recognition in the following phases: phase 1 where facial recognition is performed based on the priority pairs of students generated based on the seat preference information retrieved from the historical information database 107; and phase 2 where facial recognition is performed for the remaining seats when attendance is not determined using the historical seat preference information. In an exemplarily embodiment, during phase 1, the attendance determination system 106 performs facial recognition, for example, by executing a local binary pattern (LBP) algorithm for facial feature extractions. In this embodiment, facial image texture is divided into multiple blocks, from which a feature histogram, also referred to as an LBP histogram, of each face region is constructed separately. The LBP histogram of each block is combined to obtain a concatenated vector, that is, a global histogram of a facial image. The similarity or distance can then be measured by using the global histogram of different facial images. The global histogram of a facial image fl (x, y) is represented by: Hi,j=Σx,y I(fl (x, y)=i), where Hi,j is the global histogram and I is the LBP histogram of one block. In an exemplary embodiment, in phase 2, the attendance determination system 106 executes deep learning algorithms and performs feature extraction to identify the remaining faces.

In phase 1, the attendance determination system 106 generates the prioritized attendee scan data set for scanning each seat to identify a prioritized student. For example, the attendance determination system 106 retrieves the probability chart exemplarily illustrated in FIG. 11A from the historical information database 107 and generates the prioritized attendee scan data set for scanning seat A comprising Frank, George, and Chuck only. The attendance determination system 106 generates the priority pairs in the prioritized attendee scan data set for scanning seat A as Frank or George, Frank or Chuck, and George or Chuck. The attendance determination system 106 performs facial recognition of the distinct features of Frank, George, and Chuck from the reduced feature scan data set, in an image of seat A extracted from the images of the classroom 700. For example, the attendance determination system 106 retrieves the reduced feature scan data sets exemplarily illustrated in FIG. 10, from the historical information database 107, and performs facial recognition of facial hair or eyeglasses for the priority pair Frank or George; facial hair or hairstyle for the priority pair Frank or Chuck, and facial hair or eyeglasses for the priority pair George or Chuck in an image of seat A extracted from the images of the classroom 700. If the attendance determination system 106 recognizes either Frank, George, or Chuck at seat A by comparing the distinct features of the two students in each priority pair with the extracted image of seat A, the attendance determination system 106 locks occupancy of seat A by either Frank, George, or Chuck on seat A. If the attendance determination system 106 does not recognize either Frank, George, or Chuck at seat A, the attendance determination system 106 proceeds to scan seat B and performs facial recognition on seat A in phase 2.

Similarly, from the probability chart exemplarily illustrated in FIG. 11A, the attendance determination system 106 generates the prioritized attendee scan data set for scanning seat B comprising Harry, Brian, Frank, and Ian only. The attendance determination system 106 generates the priority pairs in the prioritized attendee scan data set for scanning seat B as Harry or Brian, Harry or Frank. Harry or Ian. Brian or Frank, Brian or Ian. and Frank or Ian. The attendance determination system 106 performs facial recognition of the distinct features of Harry, Brian, Frank, and Ian from the reduced feature scan data set, in an image of seat B extracted from the images of the classroom 700. For example, the attendance determination system 106 retrieves the reduced feature scan data sets from the historical information database 107, and performs facial recognition of facial hair or eyeglasses or baldness or hairstyle or complexion for the priority pairs Harry or Brian, Harry or Frank, Harry or Ian, Brian or Frank, Brian or Ian, and Frank or Ian, in an image of seat B extracted from the images of the classroom 700. If the attendance determination system 106 recognizes either Harry, Brian, Frank, or Ian at seat B by comparing the distinct features of the two students in each priority pair with the extracted image of seat B, the attendance determination system 106 locks occupancy of seat B by either Harry, Brian, Frank, or Ian on seat B. If the attendance determination system 106 does not recognize either Harry, Brian, Frank, or Ian at seat B, the attendance determination system 106 proceeds to scan seat C and performs facial recognition on seat B in phase 2.

If any of the above students has been identified on a different seat and the occupancy of that seat has been locked already, the attendance determination system 106 removes the identified student from the prioritized attendee scan data set for seat B to minimize processing and computational requirements. For example, if the attendance determination system 106 identifies Frank on seat A, the attendance determination system 106 only performs facial recognition of the distinct features of the students in each of the following priority pairs: Harry or Brian, Harry or Ian, and Brian or Ian in the image of seat B extracted from the images of the classroom 700.

When the attendance determination system 106 proceeds to phase 2, some of the students have already been identified on the seats using the prioritized attendee scan data set. Consider an example where there are 9 students in the classroom 700, out of which, the attendance determination system 106 has identified 6 of the students on their preferred seats. The attendance determination system 106 dynamically reduces the prioritized attendee scan data set for phase 2 to 3, thereby decreasing the processing and computational requirements. In this example, the attendance determination system 106 has identified the empty or unoccupied seats already. The attendance determination system 106, therefore, performs image processing comprising facial recognition of the remaining students on the occupied seats. The attendance determination system 106 performs facial recognition to determine which student occupies which seat and thereby locks the occupancy of the seats by those students.

If a student is absent, the attendance determination system 106 determines the total number of faces. If 8 students are present in a class of 9, the attendance determination system 106 determines which student is absent. In an embodiment, if the attendance determination system 106 determines that the unoccupied seat is, for example, seat C, the attendance determination system 106 excludes seat C while configuring the seat scan order as disclosed in the detailed description of FIG. 6 and FIGS. 11B-11C. The attendance determination system 106 retrieves the probability chart exemplarily illustrated in FIG. 11A from the historical information database 107 and generates the prioritized attendee scan data set for scanning the seats in the configured seat scan order. Moreover, the attendance determination system 106 dynamically reduces the prioritized attendee scan data set after scanning each seat. If a particular student is not identified on any of the occupied seats in the classroom 700 during phase 1 of the scanning, the attendance determination system 106 attempts to identify the student in phase 2. If the student is not identified in phase 2 either, the attendance determination system 106 marks that student as absent and reports the absentee to the teacher. The attendance determination system 106 learns and stores information of the determined attendance and the seating arrangement after each class for performing improved predictions in the next class. Furthermore, the attendance determination system 106 utilizes a minimum number of features in phase 1 for performing facial recognition and determining attendance of a student. Since the prioritized attendee scan data set of the students in phase 1 is smaller than that in phase 2, the attendance determination system 106 utilizes a lesser number of features to recognize a student. Furthermore, while scanning the seats, the attendance determination system 106 considers the deviation on a particular seat as well as the highest probability of identifying a particular student using the first priority pair on the seat. The attendance determination system 106 computes the deviation by adding the probabilities of two most probable students identified on that seat.

FIGS. 11B-11C exemplarily illustrate a table showing a probability chart comprising the probability of identifying one student from the first priority pair for each seat and the computed deviation. To generate the seat scan order, the attendance determination system 106 exemplarily illustrated in FIG. 1, adds the probabilities of the students in the first priority pair for each of the seats to determine the probability of identifying one student from the first priority pair, herein referred to as the "first scan probability". As exemplarily illustrated in FIGS. 11B-11C, for seat A, the attendance determination system 106 adds the probabilities of identifying Frank and George from the first priority pair, that is, 70%+20%, to determine the probability of identifying either Frank or George from the first priority pair on seat A. Therefore, the attendance determination system 106 computes the probability of identifying either Frank or George from the first priority pair on seat A as 90%. Similarly, the attendance determination system 106 computes the probability of identifying either Harry or Brian from the first priority pair on seat B as 60%+20%=80%; Doug or George or Alex on seat C as 40%+30%=70%; George or Alex from the first priority pair on seat D as 50%+30%=80%; Chuck or Harry from the first priority pair on seat E as 40%+30%=70%: Ian or Eric or Chuck on seat F as 40%+20%=60%; Ian or Brian or Alex on seat G as 50%+20%=70%; Doug or Chuck from the first priority pair on seat H as 40%+20%=60%; Brian or Eric from the first priority pair on seat I as 50%+30%=80%; and Eric or Doug from the first priority pair on seat J as 30%+10%=40% as exemplarily illustrated in FIGS. 11B-11C.

To compute the deviation, the attendance determination system 106 adds the total probability of identifying a student on a seat and then divides the total probability by the total number of students that have occupied that seat in the past. As exemplarily illustrated in FIGS. 11B-11C, for seat A, the attendance determination system 106 computes the deviation as follows. 70%+20%+10% divided by 3=33% as 3 students, namely, Frank, George, and Chuck have occupied seat A in the past as determined from the probability chart. Similarly, the attendance determination system 106 computes the deviations for seat B, seat C, seat D, seat E, seat F, seat G, seat H, seat I, and seat J as 25%, 33%, 25%, 25%, 20%, 25%, 20%, 40%, and 20% respectively as exemplarily illustrated in FIGS. 11B-11C. The attendance determination system 106 then configures the seat scan order by arranging the seats based on the highest probability to the lowest probability using the first scan probabilities. As there are three seats, for example, seat B, seat D, and seat I, that have the same first scan probability as exemplarily illustrated in FIGS. 11B-11C, the attendance determination system 106 arranges those seats among each other based on the deviation, that is, from the highest deviation to the lowest deviation. The attendance determination system 106, therefore, configures the following seat scan order for scanning the seats in the classroom 700 exemplarily illustrated in FIG. 7: seat A, seat I, seat B, seat D, seat C, seat E, seat G, seat F, seat H, and seat J. If the attendance determination system 106 determines a seat is unoccupied or empty, the attendance determination system 106 excludes the unoccupied seat from the seat scan order. The configuration of the seat scan order allows identification of a student in each of the priority pairs of the prioritized attendee scan data set quicker than randomly executing algorithms in an alphabetical order or a numerical order or a geographical order.

Consider an example where attendance of students 800, namely, Alex, Brian, Chuck, Doug, Eric, Frank, George, Harry, and Ian exemplarily illustrated in FIG. 8, of a classroom 700 exemplarily illustrated in FIG. 7, is to be determined by the priority-based, facial recognition-assisted attendance determination and validation system (PFR-ADVS) 100 comprising the image capture device 101, the client device 102, the attendance determination system 106, and the historical information database 107 exemplarily illustrated in FIG. 1. In this example, the classroom 700 comprises 12 seats 701, namely, seat A, seat B, seat C, seat D, seat E, seat F, seat G, seat H, seat I, seat J, seat K, and seat L. One or more of the students 800 enter the classroom 700 and using their user devices 105 exemplarily illustrated in FIG. 1, scan a unique identification code, for example, a quick-response (QR) code displayed on a display unit of a teacher's client device 102. The user devices 105 of the students 800 transmit the scanned images or scans of the QR code to the client device 102 via the network, for example, the internet. In this example, the students 800, namely, Frank, George, Harry, Alex, Ian, Brian, Chuck, and Eric, occupy the seats, namely, seat A, seat B, seat D, seat E, seat F, seat G, seat H, and seat I respectively, while Doug is absent. The client application in the client device 102 receives the scans of the QR code from the user devices 105, compares the number of scans of the QR code with the number of students 800 registered in the classroom 700, in communication with the historical information database 107, and activates the image capture device 101 for capturing multiple images of the classroom 700 to facilitate determination and validation of the attendance of the classroom 700. The image capture device 101 transmits the captured images to the client device 102 via the network. The client device 102 transmits the captured images of the classroom 700 to the attendance determination system 106 via the network.

The attendance determination system 106 processes the captured images of the classroom 700 and determines that seat C, seat J, seat K, and seat L in the classroom 700 are empty or unoccupied. Furthermore, the client application in the client device 102 determines a mismatch as the number of scans of the QR code is 9, but only 8 students are present in the classroom 700. The client device 102 transmits the information on the mismatch to the attendance determination system 106 via the network to trigger facial recognition by the attendance determination system 106. The attendance determination system 106 retrieves the seat preference information exemplarily illustrated in FIG. 11A, comprising the probabilities of students occupying seat C, seat J, seat K, and seat L from the historical information database 107. From the seat preference information, the attendance determination system 106 determines the probabilities of seat K and seat L being unoccupied are 100% and does not scan seat K and seat L. Furthermore, since the attendance determination system 106 determined that seat C and seat J are unoccupied, the attendance determination system 106 excludes seat C and seat J from the configuration of the seat scan order. In this example, the attendance determination system 106 performs the facial recognition in two phases: phase 1 where facial recognition is performed based on the priority pairs of students generated based on the seat preference information retrieved from the historical information database 107; and phase 2 where facial recognition is performed for the remaining seats when attendance is not determined using the historical seat preference information.

In phase 1, the attendance determination system 106 retrieves the prioritized attendee scan data set for scanning each seat to identify a prioritized student. For example, the attendance determination system 106 retrieves the probability chart exemplarily illustrated in FIG. 11A from the historical information database 107 and generates the following prioritized attendee scan data sets comprising the following priority pairs:

For seat A: Frank or George, Frank or Chuck, and George or Chuck;

For seat B: Harry or Brian, Harry or Frank, Harry or Ian, Brian or Frank, Brian or Ian, and Frank or Ian;

For seat C: Doug or Alex, Doug or George, and Alex or George;

For seat D: George or Alex, George or Chuck, George or Harry, Alex or Chuck, Alex or Harry, and Chuck or Harry;

For seat E: Chuck or Harry, Chuck or Frank. Chuck or Alex, Harry or Frank, Harry or Alex, and Frank or Alex;

For seat F: Ian or Eric, Ian or Chuck, Ian or Doug, Ian or Brian. Eric or Chuck, Eric or Doug, Eric or Brian, Chuck or Doug, Chuck or Brian, and Doug or Brian;

For seat G: Ian or Alex, Ian or Brian, Ian or Eric, Alex or Brian, Alex or Eric, and Brian or Eric;

For seat H: Doug or Chuck, Doug or Alex, Doug or Eric, Chuck or Alex, Chuck or Eric, and Alex or Eric;

For seat I: Brian or Eric; and

For seat J: Eric or Doug.

The attendance determination system 106 configures the following seat scan order for scanning the seats in the classroom 700: seat A, seat I, seat B, seat D, seat E, seat G, seat F, and seat H, as disclosed in the detailed description of FIGS. 11B-11C. Since seat C and seat J are found to be unoccupied, the attendance determination system 106 excludes seat C and seat J from the configured seat scan order. The attendance determination system 106 then proceeds to perform facial recognition on each of the seats in the configured seat scan order.

To scan seat A in the configured seat scan order, the attendance determination system 106 retrieves the prioritized attendee scan data set comprising the priority pairs Frank or George, Frank or Chuck, and George or Chuck, generated for seat A, from the historical information database 107. The attendance determination system 106 then retrieves the reduced feature scan data set for the priority pairs Frank or George, Frank or Chuck, and George or Chuck exemplarily illustrated in FIG. 10, generated for seat A, from the historical information database 107, and performs facial recognition of facial hair or eyeglasses for the priority pair Frank or George, facial hair or hairstyle for the priority pair Frank or Chuck, and facial hair or eyeglasses for the priority pair George or Chuck in an image of seat A extracted from the images of the classroom 700. In this example, the attendance determination system 106 recognizes Frank occupying seat A, locks occupancy of seat A by Frank, and proceeds to scan the next seat, that is, seat I, in the configured seat scan order.

To scan seat I in the configured seat scan order, the attendance determination system 106 retrieves the prioritized attendee scan data set comprising the priority pair Brian or Eric generated for seat I, from the historical information database 107. The attendance determination system 106 then retrieves the reduced feature scan data set for the priority pair Brian or Eric generated for seat I from the historical information database 107, and performs facial recognition of distinct features of the priority pair Brian or Eric in an image of seat I extracted from the images of the classroom 700. In this example, the attendance determination system 106 recognizes Eric occupying seat I, locks occupancy of seat I by Eric, and proceeds to scan the next seat, that is, seat B, in the configured seat scan order.

To scan seat B in the configured seat scan order, the attendance determination system 106 retrieves the prioritized attendee scan data set comprising the priority pairs Harry or Brian, Harry or Frank, Harry or Ian, Brian or Frank, Brian or Ian, and Frank or Ian generated for seat B, from the historical information database 107, and reduces the prioritized attendee scan data set to contain the priority pairs Harry or Brian, Harry or Ian, and Brian or Ian, as Frank has been identified on seat A already, thereby minimizing the processing and computational requirements. The attendance determination system 106 then retrieves the reduced feature scan data set for the priority pairs Harry or Brian, Harry or Ian, and Brian or Ian reduced for seat B from the historical information database 107, and performs facial recognition of the distinct features of the priority pairs Harry or Brian, Harry or Ian, and Brian or Ian in an image of seat B extracted from the images of the classroom 700. In this example, the attendance determination system 106 does not recognize Harry or Brian or Ian on seat B and proceeds to scan the next seat, that is, seat D, in the configured seat scan order.

To scan seat D, the attendance determination system 106 retrieves the prioritized attendee scan data set comprising the priority pairs George or Alex, George or Chuck, George or Harry, Alex or Chuck, Alex or Harry, and Chuck or Harry, generated for seat D, from the historical information database 107. The attendance determination system 106 then retrieves the reduced feature scan data sets for the priority pairs George or Alex, George or Chuck, George or Harry, Alex or Chuck, Alex or Harry, and Chuck or Harry, generated for seat D, from the historical information database 107, and performs facial recognition of the distinct features of the priority pairs George or Alex, George or Chuck, George or Harry, Alex or Chuck, Alex or Harry, and Chuck or Harry in an image of seat D extracted from the images of the classroom 700. In this example, the attendance determination system 106 recognizes Harry occupying seat D, locks occupancy of seat D by Harry, and proceeds to scan the next seat, that is, seat E, in the configured seat scan order.

To scan seat E, the attendance determination system 106 retrieves the prioritized attendee scan data set comprising the priority pairs Chuck or Harry, Chuck or Frank, Chuck or Alex, Harry or Frank. Harry or Alex, and Frank or Alex generated for seat E and reduces the prioritized attendee scan data set to contain the priority pair Chuck or Alex only, as Harry has been identified on seat D and Frank has been identified on seat A already, thereby minimizing the processing and computational requirements. The attendance determination system 106 then retrieves the reduced feature scan data set for the priority pair Chuck or Alex reduced for seat E and performs facial recognition of the distinct features of the priority pair Chuck or Alex only in an image of seat E extracted from the images of the classroom 700. In this example, the attendance determination system 106 recognizes Alex occupying seat E, locks occupancy of seat E by Alex, and proceeds to scan the next seat, that is, seat G, in the configured seat scan order.

To scan seat G, the attendance determination system 106 retrieves the prioritized attendee scan data set comprising the priority pairs Ian or Alex, Ian or Brian, Ian or Eric, Alex or Brian, Alex or Eric, and Brian or Eric generated for seat G, and reduces the prioritized attendee scan data set to contain the priority pair Ian or Brian only, as Alex has been identified on seat E and Eric has been identified on seat I already, thereby minimizing the processing and computational requirements. The attendance determination system 106 then retrieves the reduced feature scan data set for the priority pair Ian or Brian reduced for seat G and performs facial recognition of the distinct features of the priority pair Ian or Brian in an image of seat G extracted from the images of the classroom 700. In this example, the attendance determination system 106 recognizes Brian occupying seat G, locks occupancy of seat G by Brian, and proceeds to scan the next seat, that is, seat F, in the configured seat scan order.

To scan seat F, the attendance determination system 106 retrieves the prioritized attendee scan data set comprising the priority pairs Ian or Eric, Ian or Chuck, Ian or Doug, Ian or Brian, Eric or Chuck, Eric or Doug, Eric or Brian, Chuck or Doug, Chuck or Brian, and Doug or Brian generated for seat F, and reduces the prioritized attendee scan data set to contain the priority pairs Ian or Chuck, Ian or Doug, and Chuck or Doug, as Eric has been on seat I and Brian has been identified on seat G already, thereby minimizing the processing and computational requirements. The attendance determination system 106 then retrieves the reduced feature scan data set for the priority pairs Ian or Chuck, Ian or Doug. and Chuck or Doug reduced for seat F and performs facial recognition of the distinct features of the priority pairs Ian or Chuck, Ian or Doug, and Chuck or Doug in an image of seat F extracted from the images of the classroom 700. In this example, the attendance determination system 106 recognizes Ian occupying seat F, locks occupancy of seat F by Ian, and proceeds to scan the next seat, that is, seat H, in the configured seat scan order.

To scan seat H, the attendance determination system 106 retrieves the prioritized attendee scan data set comprising the priority pairs Doug or Chuck, Doug or Alex, Doug or Eric, Chuck or Alex, Chuck or Eric, and Alex or Eric, generated for seat H, from the historical information database 107, and reduces the prioritized attendee scan data set to contain the priority pair Doug or Chuck only, as Alex has been identified on seat E and Eric has been on seat I already, thereby minimizing the processing and computational requirements. The attendance determination system 106 then retrieves the reduced feature scan data sets for the priority pair Doug or Chuck generated for seat H from the historical information database 107, and performs facial recognition of the distinct features of the priority pair Doug or Chuck in an image of seat H extracted from the images of the classroom 700. In this example, the attendance determination system 106 recognizes Chuck occupying seat H and locks occupancy of seat H by Chuck. As there are no further seats remaining in the configured seat scan order, the attendance determination system 106 proceeds to phase 2 to determine attendance of the remaining students.

When the attendance determination system 106 proceeds to phase 2, some of the students, for example, Frank, Eric, Harry, Alex, Brian, Ian, and Chuck have already been identified on the seats, namely, seat A, seat I, seat D, seat E, seat G, seat F, and seat H respectively, using the prioritized attendee scan data sets. In this example of 9 students in the classroom 700, out of which, the attendance determination system 106 has identified 7 of the students on their preferred seats, the attendance determination system 106 dynamically reduces the prioritized attendee scan data set for phase 2 to 2, thereby minimizing the processing and computational requirements. In this example, the attendance determination system 106 has identified the empty or unoccupied seats already. The attendance determination system 106, therefore, performs image processing comprising facial recognition of the remaining students, for example, Doug and George, on the occupied seats, for example, seat B. By performing facial recognition, the attendance determination system 106 recognizes George occupying seat B and locks the occupancy of seat B by George. At this stage, the attendance determination system 106 has not found Doug on any of the seats and therefore marks Doug as absent. The attendance determination system 106 generates an attendance report marking the students Alex, Brian, Chuck, Eric, Frank, George, Harry, and Ian as present and occupying the seats, namely, seat E, seat G, seat H, seat I, seat A, seat B, seat D, and seat F respectively, and the absentee, Doug, as absent in the classroom 700, and transmits the attendance report to the teacher's client device 102. The PFRADVS 100 reduces the effort of the teacher in determining attendance of the classroom 700, as the teacher may have to roll call only those students who marked their attendance by scanning the QR code but were not recognized via facial recognition. In an embodiment, the attendance determination system 106 performs a detailed determination of attendance only if there is a difference or a mismatch in the total number of students who marked their attendance by scanning the QR code and the number of students identified by facial recognition.

The priority-based, facial recognition-assisted attendance determination and validation system (PFRADVS) 100 implements one or more specific computer programs for performing a priority-based determination and validation of attendance in a target area with minimized processing and computational requirements. The method disclosed herein improves the functionality of a computer and provides an improvement in image processing and facial recognition technology related to performing a priority-based determination and validation of attendance in a target area with minimized processing and computational requirements as follows: On implementing the method disclosed herein, the attendance determination system 106 dynamically generates and stores seat preference information of each of the attendees of the target area by performing facial recognition on the images of the target area captured by the image capture device 101 over multiple iterations, in communication with the historical information database 107. Moreover, the attendance determination system 106 generates and dynamically reduces a prioritized attendee scan data set comprising one or more priority pairs of attendees frequently identified at each of the seats, based on the seat preference information and a locked occupancy of the seats. Furthermore, the attendance determination system 106 generates a reduced feature scan data set comprising one or more distinct features of each of the attendees in each of the priority pairs of the prioritized attendee scan data set, and dynamically configures a seat scan order for scanning the seats in the target area using the seat preference information and the prioritized attendee scan data set, in communication with the historical information database 107. Then, for each of the seats in the configured seat scan order, the attendance determination system 106, through the use of separate and autonomous computer programs, in communication with the historical information database 107, performs facial recognition of the distinct features of each of the attendees in each of the priority pairs of the prioritized attendee scan data set, from the reduced feature scan data set, in an image of a current seat extracted from the images of the target area; and based on a recognition of one of the attendees in the priority pairs of the prioritized attendee scan data set occupying the current seat, the attendance determination system 106 performs at least one of: locking an occupancy of the current seat by the recognized attendee and dynamically reducing the prioritized attendee scan data set for scanning the subsequent seat in the seat scan order based on the locked occupancy of the current seat, proceeding to scan the subsequent seat in the seat scan order, and determining an absentee in the target area.

The focus of the PFRADVS 100 and the method disclosed herein is on an improvement to image processing and facial recognition technology and computer functionalities for performing a priority-based determination and validation of attendance in a target area with minimized processing and computational requirements, and not on tasks for which a generic computer is used in its ordinary capacity. Rather, the PFRADVS 100 and the method disclosed herein are directed to a specific improvement to the way the processors in the PFRADVS 100 operate, embodied in, for example, dynamically generating and storing the seat preference information of each of the attendees of the target area; generating and dynamically reducing a prioritized attendee scan data set comprising one or more priority pairs of attendees frequently identified at each of the seats; generating a reduced feature scan data set comprising one or more distinct features of each of the attendees in each of the priority pairs of the prioritized attendee scan data set; dynamically configuring a seat scan order for scanning the seats in the target area; performing facial recognition of the distinct features of each of the attendees in each of the priority pairs of the prioritized attendee scan data set, from the reduced feature scan data set, in an image of a current seat extracted from the images of the target area: and based on a recognition of one of the attendees in the priority pairs of the prioritized attendee scan data set occupying the current seat, performing at least one of: locking an occupancy of the current seat by the recognized attendee and dynamically reducing the prioritized attendee scan data set for scanning the subsequent seat in the seat scan order based on the locked occupancy of the current seat, proceeding to scan the subsequent seat in the seat scan order, and determining an absentee in the target area. The PFRADVS 100 minimizes processing and computational requirements by the prioritization of the attendees, the distinct features of the attendees, and the seats, and by identifying faces by using minimized information for facial recognition, thereby speeding up a typically time-consuming artificial intelligence process and increasing efficiency of the processor of the attendance determination system 106. Since the computational requirements are minimized in the PFRADVS 100, the software of the attendance determination system 106 does not require substantial computer specifications.

In the method disclosed herein, the design and the flow of data and interactions between the image capture device 101, the client device 102, the attendance determination system 106, and the historical information database 107 of the PFRADVS 100 are deliberate, designed, and directed. The interactions between the attendance determination system 106 and the image capture device 101, the client device 102, and the historical information database 107 allow the PFRADVS 100 to determine and validate attendance in a target area with minimized processing and computational requirements. The steps performed by the PFRADVS 100 disclosed above require seven or more separate computer programs and subprograms, the execution of which cannot be performed by a person using a generic computer with a generic program. The steps performed by the PFRADVS 100 disclosed above are tangible, provide useful results, and are not abstract. The hardware and software implementation of the PFRADVS 100 disclosed herein comprising the image capture device 101, the client device 102, the attendance determination system 106, the historical information database 107, and one or more processors, is an improvement in computer related, image processing and facial recognition technology.

Figure 12:
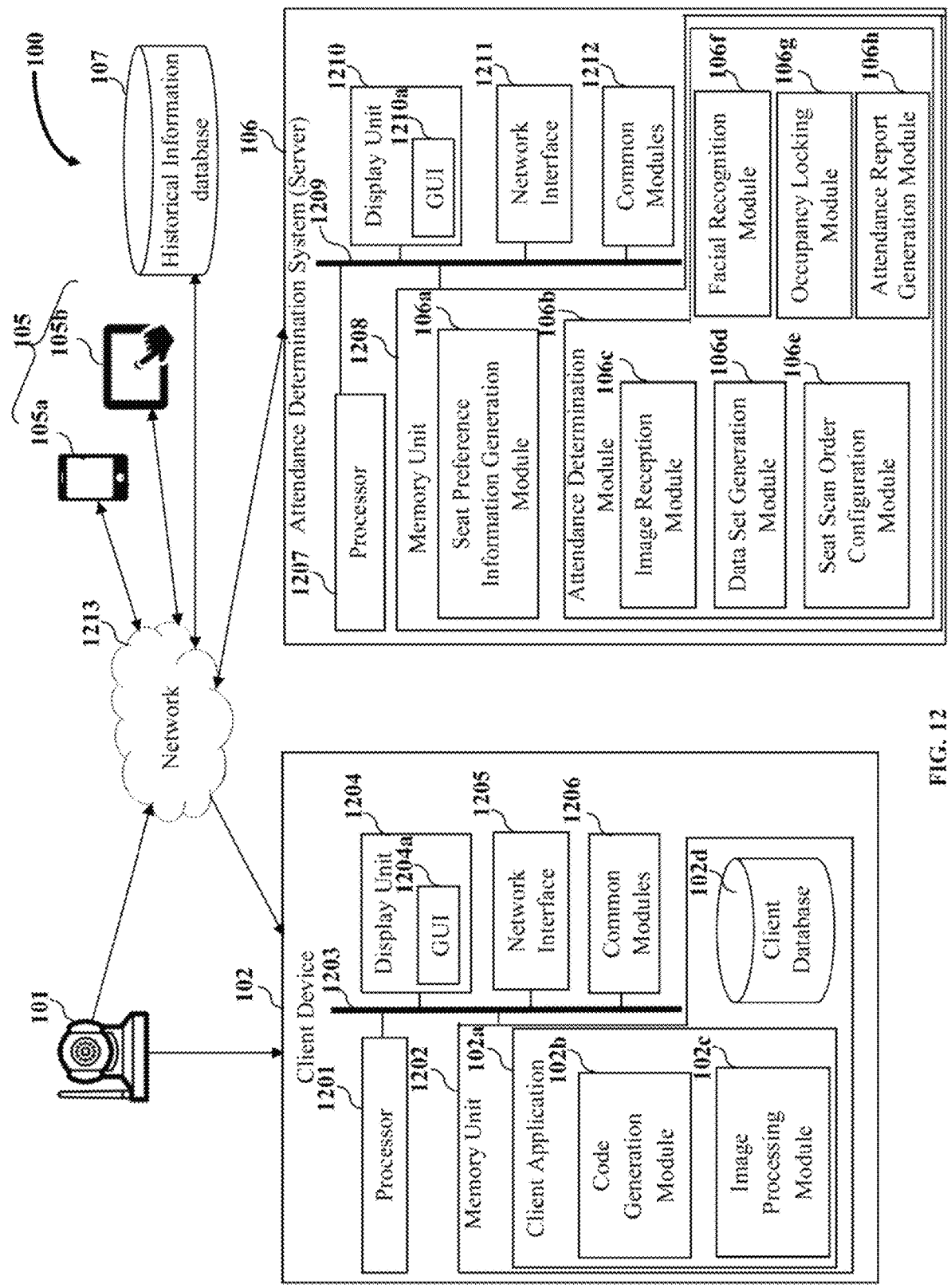
FIG. 12 exemplarily illustrates an architectural diagram showing an exemplary implementation of modules of the priority-based, facial recognition-assisted attendance determination and validation system for performing a priority-based determination and validation of attendance in a target area with minimized processing and computational requirements.

FIG. 12 exemplarily illustrates an architectural diagram showing an exemplary implementation of modules of the priority-based, facial recognition-assisted attendance determination and validation system (PFRADVS) 100 for performing a priority-based determination and validation of attendance in a target area with minimized processing and computational requirements. In an embodiment, the PFRADVS 100 disclosed herein comprises the image capture device 101, the client device 102, the attendance determination system 106, and the historical information database 107 in operable communication with each other via a network 1213, for example, a short-range network or a long-range network. The network 1213 is, for example, one of the internet, an intranet, a wired network, a wireless network, a communication network that implements Bluetootth® of Bluetooth Sig, Inc., a network that implements Wi-Fi® of Wi-Fi Alliance Corporation, an ultra-wideband communication network (UWB), a wireless universal serial bus (USB) communication network, a communication network that implements ZigBee® of ZigBee Alliance Corporation, a general packet radio service (GPRS) network, a mobile telecommunication network such as a global system for mobile (GSM) communications network, a code division multiple access (CDMA) network, a third generation (3G) mobile communication network, a fourth generation (4G) mobile communication network, a fifth generation (5G) mobile communication network, a long-term evolution (LTE) mobile communication network, a public telephone network, etc., a local area network, a wide area network, an internet connection network, an infrared communication network, etc., or a network formed from any combination of these networks.

The client device 102 and the attendance determination system 106 are computer systems that are programmable using high-level computer programming languages. In an embodiment, the client device 102 and the attendance determination system 106 are implemented using programmed and purposeful hardware. In an embodiment, the client device 102 is accessible to users, for example, through a broad spectrum of technologies and user devices 105 such as smart phones 105a, tablet computing devices 105b, etc., with access to the network 1213. Users, for example, attendees of a target area such as students in a classroom, may transmit scans of a unique identification code displayed on a display unit 1204 of the client device 102 to the client device 102 using their user devices 105 via the network 1213. The image capture device 101 captures and transmits images of the target area to the client device 102 and/or the attendance determination system 106 via the network 1213. The attendance determination system 106 is an electronic device, for example, one or more of a server, a workstation, a personal computer, a tablet computing device, a mobile computer, a portable computing device, a network-enabled computing device, an interactive network-enabled communication device, any other suitable computing equipment, combinations of multiple pieces of computing equipment, etc.

In an embodiment, the attendance determination system 106 is implemented in a cloud computing environment. As used herein, "cloud computing environment" refers to a processing environment comprising configurable computing physical and logical resources, for example, networks, servers, storage media, virtual machines, applications, services, etc., and data distributed over a network, for example, the internet. The cloud computing environment provides on-demand network access to a shared pool of the configurable computing physical and logical resources. In an embodiment, the attendance determination system 106 is a cloud computing-based platform implemented as a service for performing a priority-based determination and validation of attendance in a target area with minimized processing and computational requirements. In another embodiment, the attendance determination system 106 is implemented as an on-premise platform comprising on-premise software installed and run on computers on the premises of the target area.

The historical information database 107 is any storage area or medium that can be used for storing data and files. The historical information database 107 can be, for example, any of a structured query language (SQL) data store or a not only SQL (NoSQL) data store such as the Microsoft® SQL Server®, the Oracle® servers, the MySQL® database of MySQL AB Limited Company, the mongoDB® of MongoDB, Inc., the Neo4j graph database of Neo Technology Corporation, the Cassandra database of the Apache Software Foundation, the HBase® database of the Apache Software Foundation, etc. In an embodiment, the historical information database 107 can also be a location on a file system of the attendance determination system 106. In another embodiment, the historical information database 107 can be remotely accessed by the attendance determination system 106 via the network 1213. In another embodiment, the historical information database 107 is configured as a cloud-based database implemented in a cloud computing environment, where computing resources are delivered as a service over the network 1213.

The PFRADVS 100 disclosed herein comprises non-transitory, computer-readable storage media, for example, memory units 1202 and 1208, for storing computer program instructions defined by the modules, for example, 102b and 102c of the client application 102a on the client device 102, and the modules, for example, 106a and 106b of the attendance determination system 106 respectively. As used herein, "non-transitory computer-readable storage media" refers to all computer-readable storage media, for example, non-volatile computer readable storage media, volatile computer readable storage media. Non-volatile computer readable storage media comprise, for example, solid state drives, optical discs or magnetic disks, and other persistent volatile memory media including a dynamic random-access memory (DRAM), which typically constitute a main memory. Volatile memory media comprise, for example, a register memory, a processor cache, a random-access memory (RAM), etc. In an embodiment, the memory units 1202 and 1208 of the client device 102 and the attendance determination system 106 respectively, are operably coupled to the image capture device 101 and configured to store the images captured by the image capture device 101. The PFRADVS 100 disclosed herein further comprises processors 1201 and 1207 operably and communicatively coupled to the corresponding memory units 1202 and 1208 respectively, for executing the computer program instructions defined by the modules, for example, 102b and 102c of the client application 102a on the client device 102, and the modules, for example, 106a and 106b, of the attendance determination system 106 respectively. In an embodiment, the processors 1201 and 1207 of the client device 102 and the attendance determination system 106 respectively, are operably coupled to the image capture device 101 and configured to process the images captured by the image capture device 101.

The memory units 1202 and 1208 of the client device 102 and the attendance determination system 106 respectively, are used for storing program instructions, applications, and data. The memory units 1202 and 1208 are, for example, random-access memories (RAMs) or other types of dynamic storage devices that store information and instructions for execution by the respective processors 1201 and 1207. The memory units 1202 and 1208 also store temporary variables and other intermediate information used during execution of the instructions by the respective processors 1201 and 1207. The client device 102 and the attendance determination system 106 further comprise read only memories (ROMs) or other types of static storage devices that store static information and instructions for the respective processors 1201 and 1207. In an embodiment, the client application 102a is stored in the memory unit 1202 of the client device 102. Similarly, the modules, for example, 106a and 106b, of the attendance determination system 106 are stored in the memory unit 1208 of the attendance determination system 106.

The processor 1201 of the client device 102 is configured to execute the computer program instructions defined by the client application 102a. The processor 1207 of the attendance determination system 106 is configured to execute the computer program instructions defined by the modules, for example, 106a and 106b, of the attendance determination system 106 for performing the priority-based determination of the attendance in the target area with minimized processing and computational requirements. The processors 1201 and 1207 refer to any one or more microprocessors, central processing unit (CPU) devices, finite state machines, computers, microcontrollers, digital signal processors, logic, a logic device, an user circuit, an application specific integrated circuit (ASIC), a field-programmable gate array (FPGA), a chip, etc., or any combination thereof, capable of executing computer programs or a series of commands, instructions, or state transitions. In an embodiment, the processors 1201 and 1207 are implemented as processor sets comprising, for example, a programmed microprocessor and a math or graphics co-processor. The processors 1201 and 1207 are selected, for example, from the Intel® processors such as the Itanium® microprocessor, the Pentium® processors, the Intel® Core i5 processor, the Intel® Core i7 processor, etc., Advanced Micro Devices (AMD®) processors such as the Athlon® processor, UltraSPARC® processors, microSPARC® processors, hp® processors, International Business Machines (IBM®) processors such as the PowerPC® microprocessor, the MIPS® reduced instruction set computer (RISC) processor of MIPS Technologies, Inc., RISC based computer processors of ARM Holdings, Motorola® processors, Qualcomm® processors, etc. The client device 102 and the attendance determination system 106 are not limited to employing their respective processors 1201 and 1207. In an embodiment, the client device 102 and the attendance determination system 106 employ controllers or microcontrollers. The processor 1201 of the client device 102 executes the modules, for example, 102b and 102c, of the client application 102a. The processor 1207 of the attendance determination system 106 executes the modules 106a and 106b and sub-modules of the attendance determination system 106.

As exemplarily illustrated in FIG. 12, the client device 102 further comprises a data bus 1203, the display unit 1204, a network interface 1205, and common modules 1206. Similarly, as exemplarily illustrated in FIG. 12, the attendance determination system 106 further comprises a data bus 1209, a display unit 1210, a network interface 1211, and common modules 1212. The data bus 1203 of the client device 102 permits communications between the modules, for example, 1201, 1202, 1204, 1205, 1206, etc., of the client device 102. The data bus 1209 of the attendance determination system 106 permits communications between the modules, for example, 1207, 1208, 1210, 1211, 1212, etc., of the attendance determination system 106. The display unit 1204 of the client device 102, via a graphical user interface (GUI) 1204a, displays information, display interfaces, user interface elements such as checkboxes, input text fields, etc., for example, for allowing a user such as a teacher to select a class, select a course, review the attendance report generated by the attendance determination system 106, etc. The client device 102 renders the GUI 1204a on the display unit 1204 for receiving the teacher's selection inputs, etc., for performing a priority-based determination and validation of attendance of the target area. In an embodiment, the display unit 1204 is externally coupled to the client device 102. The display unit 1210 of the attendance determination system 106, via a GUI 1210a, displays information, display interfaces, user interface elements such as checkboxes, input text fields, etc., for example, for allowing an administrator of the attendance determination system 106 to maintain the attendance determination system 106. The attendance determination system 106 renders the GUI 1210a on the display unit 1210 for displaying information related to the attendance of the target area. In an embodiment, the display unit 1210 is externally coupled to the attendance determination system 106. The GUIs 1204a and 1210a of the client device 102 and the attendance determination system 106 respectively, comprises, for example, online web interfaces, web-based downloadable application interfaces, mobile-based downloadable application interfaces, etc. The display units 1204 and 1210 of the client device 102 and the attendance determination system 106 respectively, display the GUIs 1204a and 1210a respectively.

The network interfaces 1205 and 1211 of the client device 102 and the attendance determination system 106 respectively, enable connection of the client device 102 and the attendance determination system 106 respectively, to the network 1213. In an embodiment, the network interfaces 1205 and 1211 are provided as interface cards also referred to as line cards. The network interfaces 1205 and 1211 are, for example, one or more of infrared interfaces, interfaces implementing Wi-Fi® of Wi-Fi Alliance Corporation, universal serial bus interfaces, FireWire® interfaces of Apple Inc., Ethernet interfaces, frame relay interfaces, cable interfaces, digital subscriber line interfaces, token ring interfaces, peripheral controller interconnect interfaces, local area network interfaces, wide area network interfaces, interfaces using serial protocols, interfaces using parallel protocols, Ethernet communication interfaces, asynchronous transfer mode interfaces, high speed serial interfaces, fiber distributed data interfaces, interfaces based on transmission control protocol/internet protocol, interfaces based on wireless communications technology such as satellite technology, radio frequency technology, near field communication, etc. The common modules 1206 and 1212 of the client device 102 and the attendance determination system 106 respectively comprise, for example, input/output (I/O) controllers, input devices, output devices, fixed media drives such as hard drives, removable media drives for receiving removable media, etc. Computer applications and programs are used for operating the client device 102 and the attendance determination system 106. The programs are loaded onto fixed media drives and into the memory units 1202 and 1208 of the client device 102 and the attendance determination system 106 respectively, via their respective removable media drives. In an embodiment, the computer applications and programs are loaded into the memory units 1202 and 1208 of the client device 102 and the attendance determination system 106 respectively, directly via the network 1213.

In an exemplary implementation as exemplarily illustrated in FIG. 12, the client application 102a comprises a code generation module 102b and an image processing module 102c. In an embodiment, the code generation module 102b and the image processing module 102c of the client application 102a are stored in the memory unit 1202 and executed by the processor 1201. The code generation module 102b generates a unique identification code, for example, a one-dimensional barcode, or a two-dimensional barcode such as a quick-response (QR) code, or a three-dimensional barcode, etc., associated, for example, with a class or a teacher of a class, and displays the unique identification code on the GUI 1204a of the display unit 1204. The attendees of the target area, for example, students, via their user devices 105, scan the unique identification code and transmit the scanned images of the unique identification code to the client device 102 via the network 1213. The image processing module 102e receives scans of the unique identification code from the user devices 105, compares the number of the received scans of the unique identification code with the number of attendees registered in the target area in communication with a client database 102d and/or the historical information database 107, and activates the image capture device 101 for capturing images of the target area to facilitate the determination and validation of the attendance of the target area. The client database 102d of the client device 102 stores the images transmitted by the user devices 105 and the image capture device 101, and the results of the image processing executed by the image processing module 102c. In an embodiment, the client database 102d is any storage area or medium that can be used for storing data and files. The client database 102d can be, for example, any of a structured query language (SQL) data store or a not only SQL (NoSQL) data store such as the Microsoft® SQL Server®, the Oracles servers, the MySQL® database of MySQL AB Limited Company, the mongoDB® of MongoDB. Inc., the Neo4j graph database of Neo Technology Corporation, the Cassandra database of the Apache Software Foundation, the HBase® database of the Apache Software Foundation, etc. In an embodiment, the client database 102d can also be a location on a file system of the client device 102. In another embodiment, the client database 102d can be remotely accessed by the client application 102a of the client device 102 via the network 1213.

In an exemplary implementation as shown in FIG. 12, the attendance determination system 106 comprises a seat preference information generation module 106a and an attendance determination module 106b. In an embodiment, the seat preference information generation module 106a and the attendance determination module 106b of the attendance determination system 106 are stored in the memory unit 1208 and executed by the processor 1207. The seat preference information generation module 106a dynamically generates and stores seat preference information of each of the attendees of the target area by performing facial recognition on the images of the target area captured by the image capture device 101 over multiple iterations, in communication with the historical information database 107. The attendance determination module 106b determines the attendance of the target area using the dynamically generated and stored seat preference information as follows. In an exemplary implementation as shown in FIG. 12, the attendance determination module 106b comprises an image reception module 106c, a data set generation module 106d, a seat scan order configuration module 106e, a facial recognition module 106f, and an occupancy locking module 106g that are stored in the memory unit 1208 and executed by the processor 1207.

The image reception module 106c receives one or more images of the target area comprising multiple seats from the image capture device 101. The data set generation module 106d generates a prioritized attendee scan data set comprising one or more priority pairs of attendees frequently identified at each of the seats, based on the seat preference information. The data set generation module 106d dynamically reduces the prioritized attendee scan data set based on a locked occupancy of the seats. The data set generation module 106d also generates a reduced feature scan data set comprising one or more distinct features of each of the attendees in each of the priority pairs of the prioritized attendee scan data set and stores the reduced feature scan data set in the historical information database 107. The seat scan order configuration module 106e, in communication with the historical information database 107, dynamically configures a seat scan order for scanning the seats in the target area using the seat preference information and the prioritized attendee scan data set. In an embodiment, the seat scan order configuration module 106e computes a deviation on each of the seats using the seat preference information and the prioritized attendee scan data set for the dynamic configuration of the seat scan order.

For each of the seats in the seat scan order, the facial recognition module 106f, in communication with the historical information database 107, performs facial recognition of one or more distinct features of each of the attendees in each of the priority pairs of the prioritized attendee scan data set, from the reduced feature scan data set, in an image of a current seat extracted from the received images of the target area. Based on recognition of one of the attendees in one or more priority pairs of the prioritized attendee scan data set occupying the current seat, either the occupancy locking module 106g locks an occupancy of the current seat by the recognized attendee and triggers the data set generation module 106d to dynamically reduce the prioritized attendee scan data set for scanning the subsequent seat in the seat scan order based on the locked occupancy of the current seat, or the facial recognition module 106f proceeds to scan the subsequent seat in the seat scan order, or the facial recognition module 106f determines an absentee in the target area. After locking the occupancy of the recognized attendees at their respective seats in the target area, the occupancy locking module 106g generates and dynamically stores a seating arrangement of each session in the target area and the determined attendance of each session in the historical information database 107 for dynamically enhancing or improving the seat preference information and subsequent generation of the prioritized attendee scan data set for each of the seats in the target area over time. The seat preference information generation module 106a communicates with the occupancy locking module 106g and the historical information database 107 for dynamically enhancing or improving the seat preference information over time. The data set generation module 106d communicates with the occupancy locking module 106g and the historical information database 107 for dynamically enhancing or improving the subsequent generation of the prioritized attendee scan data set for each of the seats in the target area over time.

In an embodiment, the attendance determination module 106b further comprises an attendance report generation module 106h that is stored in the memory unit 1208 and executed by the processor 1207. The attendance report generation module 106h generates an attendance report comprising a seating arrangement of a session, the attendees occupying the seats, and absentees in the target area, and transmits the attendance report to an entity, for example, a teacher's user device or the client device 102 associated with the target area.

The code generation module 102b and the image processing module 102c of the client application 102a are disclosed above as software implemented on the processor 1201 of the client device 102. Similarly, the modules, for example, 106a, 106b, 106c, 106d, 106e, 106f, 106g, 106h, etc., of the attendance determination system 106 are disclosed above as software implemented on the processor 1207 of the attendance determination system 106. In an embodiment, the modules, for example, 102b and 102c of the client device 102, and the modules, for example, 106a, 106b, 106c, 106d, 106e, 106f, 106g, 106h, etc., of the attendance determination system 106 are implemented completely in hardware. In another embodiment, the modules, for example, 102b and 102c of the client device 102, and the modules, for example, 106a, 106b, 106c, 106d, 106e, 106f, 106g, 106h, etc., of the attendance determination system 106 are implemented by logic circuits to carry out their respective functions disclosed above. In another embodiment, the PFRADVS 100 is also implemented as a combination of hardware and software including the image capture device 101 and multiple processors, for example, 1201 and 1207, that are used to implement the modules, for example, 102b and 102c of the client device 102 and the modules, for example, 106a, 106b, 106c, 106d, 106e, 106f, 106g, 106h, etc., of the attendance determination system 106 respectively.

Each of the processors 1201 and 1207 executes an operating system selected, for example, from the Linux® operating system, the Unix® operating system, any version of the Microsoft® Windows® operating system, the Mac OS of Apple Inc., the IBM® OS/2, VxWorks® of Wind River Systems, Inc., QNX Neutrino® developed by QNX Software Systems Ltd., the Palm OS®, the Solaris operating system developed by Sun Microsystems, Inc., the Android® operating system of Google LLC, the Windows Phone® operating system of Microsoft Corporation, the BlackBerry® operating system of BlackBerry Limited, the iOS operating system of Apple Inc., the Symbian™ operating system of Symbian Foundation Limited, etc. The client device 102 and the attendance determination system 106, each employs the operating system for performing multiple tasks. The operating systems are responsible for management and coordination of activities and sharing of resources of the client device 102 and the attendance determination system 106. The operating systems further manage security of the client device 102 and the attendance determination system 106, peripheral devices connected to the client device 102 and the attendance determination system 106, and network connections. The operating systems employed on the client device 102 and the attendance determination system 106 recognize, for example, inputs provided by the users of the client device 102 and the attendance determination system 106 using one of the input devices, the output devices, files, and directories stored locally on the fixed media drive. The operating systems on the client device 102 and the attendance determination system 106 execute different programs using the respective processors 1201 and 1207. The processors 1201 and 1207 and the respective operating systems together define a computer platform for which application programs in high level programming languages are written.

The processor 1201 of the client device 102 retrieves instructions defined by the code generation module 102b and the image processing module 102c of the client application 102a for performing respective functions disclosed above. The processor 1207 of the attendance determination system 106 retrieves instructions defined by the seat preference information generation module 106a and the image reception module 106c, the data set generation module 106d, the seat scan order configuration module 106e, the facial recognition module 106f, the occupancy locking module 106g, and the attendance report generation module 106h of the attendance determination module 106b for performing respective functions disclosed above. The processor 1201 of the client device 102 retrieves instructions for executing the modules, for example, 102b and 102c, of the client application 102a from the memory unit 1202 of the client device 102. The processor 1207 of the attendance determination system 106 retrieves instructions for executing the modules, for example, 106a, 106b, 106c, 106d, 106e, 106f, 106g, 106h, etc., from the memory unit 1208 of the attendance determination system 106. A program counter determines the location of the instructions in the respective memory units 1202 and 1208. The program counter stores a number that identifies the current position in the program of each of the modules, for example, 102b and 102c, of the client device 102 and the modules, for example, 106a, 106b, 106c, 106d, 106e, 106f, 106g, 106h, etc., of the attendance determination system 106. The instructions fetched by the processors 1201 and 1207 of the client device 102 and the attendance determination system 106 respectively, from the respective memory units 1202 and 1208 after being processed are decoded. The instructions are stored in an instruction register in the respective processors 1201 and 1207. After processing and decoding, the processors 1201 and 1207 execute their respective instructions, thereby performing one or more processes defined by those instructions.

At the time of execution, the instructions stored in the instruction register are examined to determine the operations to be performed. The processors 1201 and 1207 then perform the specified operations. The operations comprise arithmetic operations and logic operations. The operating systems perform multiple routines for performing a number of tasks required to assign the input devices, the output devices, and the respective memory units 1202 and 1208 for execution of the modules, for example, 102b and 102c, of the client device 102 and the modules, for example, 106a, 106b, 106c, 106d, 106e, 1061, 106g, 106h, etc., of the attendance determination system 106 respectively. The tasks performed by the operating systems comprise, for example, assigning memory to the modules, for example, 102b and 102c, of the client device 102 and the modules, for example, 106a, 106b, 106c, 106d, 106e, 1061, 106g, 106h, etc., of the attendance determination system 106 and to data used by the client device 102 and the attendance determination system 106, moving data between the respective memory units 1202 and 1208 and disk units, and handling input/output operations. The operating systems perform the tasks on request by the operations and after performing the tasks, the operating systems transfer the execution control back to the respective processors 1201 and 1207. The processors 1201 and 1207 continue the execution to obtain one or more outputs.

For purposes of illustration, the detailed description refers to the modules, for example, 102b and 102c, of the client device 102 and the modules, for example, 106a, 106b, 106c, 106*d*, 106*e*, 106*f*, 106*g*, 106*h*, etc., of the attendance determination system 106 being run locally on single computer systems; however the scope of the PFRADVS 100 and the method disclosed herein is not limited to the modules, for example, 102*b* and 102*c*, of the client device 102 and the modules, for example, 106*a*, 106*b*, 106*c*, 106*d*, 106*e*, 106*f*, 106*g*, 106*h*, etc., of the attendance determination system 106 being run locally on single computer systems via the operating systems and the respective processors 1201 and 1207, but may be extended to run remotely over the network 1213 by employing a web browser and a remote server, a mobile phone, or other electronic devices. In an embodiment, one or more portions of the PFRADVS 100 are distributed across one or more computer systems (not shown) coupled to the network 1213. In an embodiment, the modules, for example, 106*a*, 106*b*, 106*c*, 106*d*, 106*e*, 106*f*, 106*g*. 106*h*, etc., of the attendance determination system 106 are implemented on the client device 102 and executed by the processor 1201 on the client device 102.

The non-transitory computer-readable storage media disclosed herein store computer program instructions executable by the processors 1201 and 1207 for performing a priority-based determination and validation of attendance in a target area with minimized processing and computational requirements. The computer program instructions implement the processes of various embodiments disclosed above and perform additional steps that may be required and contemplated for performing a priority-based determination and validation of attendance in a target area with minimized processing and computational requirements. When the computer program instructions are executed by the processors 1201 and 1207, the computer program instructions cause the processors 1201 and 1207 to perform the steps of the method for performing a priority-based determination and validation of attendance in a target area with minimized processing and computational requirements as disclosed in the detailed descriptions of FIGS. 2A-11C. In an embodiment, a single piece of computer program code comprising computer program instructions performs one or more steps of the method disclosed in the detailed descriptions of FIGS. 2A-11C. The processors 1201 and 1207 of the client device 102 and the attendance determination system 106 respectively, retrieve these computer program instructions and executes them.

A module, or an engine, or a unit, as used herein, refers to any combination of hardware, software, and/or firmware. As an example, a module, or an engine, or a unit may include hardware, such as a microcontroller, associated with a non-transitory, computer-readable storage medium to store computer program codes adapted to be executed by the microcontroller. Therefore, references to a module, or an engine, or a unit, in an embodiment, refers to the hardware, which is specifically configured to recognize and/or execute the computer program codes to be held on a non-transitory, computer-readable storage medium. Furthermore, in another embodiment, use of a module, or an engine, or a unit refers to the non-transitory, computer-readable storage medium including the computer program codes, which is specifically adapted to be executed by the microcontroller to perform predetermined operations. In another embodiment, the term "module" or "engine" or "unit" refers to the combination of the microcontroller and the non-transitory, computer-readable storage medium. Often module or engine boundaries that are illustrated as separate commonly vary and potentially overlap. For example, a module or an engine or a unit may share hardware, software, firmware, or a combination thereof, while potentially retaining some independent hardware, software, or firmware. In various embodiments, a module or an engine or a unit includes any suitable logic.

It is apparent in different embodiments that the various methods, algorithms, and computer readable programs disclosed herein are implemented on non-transitory computer readable storage media appropriately programmed for computing devices. The non-transitory computer readable storage media participate in providing data, for example, instructions that are read by a computer, a processor or a similar device. In different embodiments, the "non-transitory computer readable storage media" also refer to a single medium or multiple media, for example, a centralized database, a distributed database, and/or associated caches and servers that store one or more sets of instructions that are read by a computer, a processor or a similar device. The "non-transitory computer readable storage media" also refer to any medium capable of storing or encoding a set of instructions for execution by a computer, a processor or a similar device and that causes a computer, a processor or a similar device to perform any one or more of the methods disclosed herein. Common forms of the non-transitory computer readable storage media comprise, for example, a floppy disk, a flexible disk, a hard disk, magnetic tape, a laser disc, a Blu-ray Disc® of the Blu-ray Disc Association, any magnetic medium, a compact disc-read only memory (CD-ROM), a digital versatile disc (DVD), any optical medium, a flash memory card, punch cards, paper tape, any other physical medium with patterns of holes, a random access memory (RAM), a programmable read only memory (PROM), an erasable programmable read only memory (EPROM), an electrically erasable programmable read only memory (EEPROM), a flash memory, any other memory chip or cartridge, or any other medium from which a computer can read.

In an embodiment, the computer programs that implement the methods and algorithms disclosed herein are stored and transmitted using a variety of media, for example, the computer readable media in various manners. In an embodiment, hard-wired circuitry or custom hardware is used in place of, or in combination with, software instructions for implementing the processes of various embodiments. Therefore, the embodiments are not limited to any specific combination of hardware and software. The computer program codes comprising computer executable instructions can be implemented in any programming language. Examples of programming languages that can be used comprise C, C++, C #. Java®. JavaScript®, Fortran, Ruby, Perl®, Python®, Visual Basic®, hypertext preprocessor (PHP), Microsoft® .NET, Objective-C®, etc. Other object-oriented, functional, scripting, and/or logical programming languages can also be used. In an embodiment, the computer program codes or software programs are stored on or in one or more mediums as object code. In another embodiment, various aspects of the PFRADVS 100 and the method disclosed herein are implemented in a non-programmed environment comprising documents created, for example, in a hypertext markup language (HTML), an extensible markup language (XML), or other format that render aspects of the GUIs, for example, 1204*a* and 1210*a* or perform other functions, when viewed in a visual area or a window of a browser program. In another embodiment, various aspects of the PFRADVS 100 and the method disclosed herein are implemented as programmed elements, or non-programmed elements, or any suitable combination thereof.

Where databases are described such as the client database 102*d* and the historical information database 107, it will be understood by one of ordinary skill in the art that (i)

alternative database structures to those described may be employed, and (ii) other memory structures besides databases may be employed. Any illustrations or descriptions of any sample databases disclosed herein are illustrative arrangements for stored representations of information. In an embodiment, any number of other arrangements are employed besides those suggested by tables illustrated in the drawings or elsewhere. Similarly, any illustrated entries of the databases represent exemplary information only; one of ordinary skill in the art will understand that the number and content of the entries can be different from those disclosed herein. In another embodiment, despite any depiction of the databases as tables, other formats including relational databases, object-based models, and/or distributed databases are used to store and manipulate the data types disclosed herein. Object methods or behaviors of a database can be used to implement various processes such as those disclosed herein. In another embodiment, the databases are, in a known manner, stored locally or remotely from a device that accesses data in such a database. In embodiments where there are multiple databases in the PFRADVS 100, the databases are integrated to communicate with each other for enabling simultaneous updates of data linked across the databases, when there are any updates to the data in one of the databases.

The PFRADVS 100 and the method disclosed herein can be configured to work in a network environment comprising one or more computers that are in communication with one or more devices via a network. In an embodiment, the computers communicate with the devices directly or indirectly, via a wired medium or a wireless medium such as the Internet, a local area network (LAN), a wide area network (WAN) or the Ethernet, a token ring, or via any appropriate communications mediums or combination of communications mediums. Each of the devices comprises processors, examples of which are disclosed above, that are adapted to communicate with the computers. In an embodiment, each of the computers is equipped with a network communication device, for example, a network interface card, a modem, or other network connection device suitable for connecting to a network. Each of the computers and the devices executes an operating system, examples of which are disclosed above. While the operating systems may differ depending on the type of computers, the operating systems provide the appropriate communications protocols to establish communication links with the network. Any number and type of machines may be in communication with the computers.

The PFRADVS 100 and the method disclosed herein are not limited to a particular computer system platform, processor, operating system, or network. In an embodiment, one or more embodiments of the PFRADVS 100 and the method disclosed herein are distributed among one or more computer systems, for example, servers configured to provide one or more services to one or more client computers, or to perform a complete task in a distributed system. For example, one or more embodiments of the PFRADVS 100 and the method disclosed herein are performed on a client-server system that comprises components distributed among one or more server systems that perform multiple functions according to various embodiments. These components comprise, for example, executable, intermediate, or interpreted code, which communicate over a network using a communication protocol. The PFRADVS 100 and the method disclosed herein are not limited to be executable on any particular system or group of systems, and are not limited to any particular distributed architecture, network, or communication protocol.

The foregoing examples and illustrative implementations of various embodiments have been provided merely for explanation and are in no way to be construed as limiting of the PFRADVS 100 and the method disclosed herein. While the PFRADVS 100 and the method have been described with reference to various embodiments, illustrative implementations, drawings, and techniques, it is understood that the words, which have been used herein, are words of description and illustration, rather than words of limitation. Furthermore, although the PFRADVS 100 and the method have been described herein with reference to particular means, materials, techniques, and embodiments, the PFRADVS 100 and the method are not intended to be limited to the particulars disclosed herein; rather, the PFRADVS 100 and the method extend to all functionally equivalent structures, methods and uses, such as are within the scope of the appended claims. While multiple embodiments are disclosed, it will be understood by those skilled in the art, having the benefit of the teachings of this specification, that the PFRADVS 100 and the method disclosed herein are capable of modifications and other embodiments may be effected and changes may be made thereto, without departing from the scope and spirit of the PFRADVS 100 and the method disclosed herein.

What is claimed is:

1. A system for performing a priority-based determination of attendance in a target area with minimized processing and computational requirements, the system comprising:
    an image capture device configured to capture images of the target area, wherein the target area comprises a plurality of seats comprising seats occupied by one or more of a plurality of attendees and unoccupied seats;
    non-transitory, computer-readable storage media operably coupled to the image capture device and configured to store the captured images of the target area and computer program instructions executable by at least one processor;
    the at least one processor communicatively coupled to the image capture device and the non-transitory, computer-readable storage media; and
    one or more modules defining computer program instructions, which when executed by the at least one processor, cause the at least one processor to:
        dynamically generate and store seat preference information of each of the attendees of the target area by performing facial recognition on the images of the target area captured by the image capture device over a plurality of iterations, in communication with a historical information database; and
        determine the attendance of the target area using the dynamically generated and stored seat preference information, by:
            receiving one or more images of the target area comprising the plurality of seats from the image capture device;
            generating a prioritized attendee scan data set based on the seat preference information, wherein the prioritized attendee scan data set comprises one or more priority pairs of attendees frequently identified at each of the seats, and wherein the prioritized attendee scan data set is dynamically reduced based on a locked occupancy of the seats;
            generating a reduced feature scan data set comprising one or more distinct features of each of the attendees in each of the one or more priority pairs of the prioritized attendee scan data set and storing the reduced feature scan data set in the historical information database;

dynamically configuring a seat scan order for scanning the seats in the target area using the seat preference information and the prioritized attendee scan data set, in communication with the historical information database; and for each of the seats in the seat scan order:
in communication with the historical information database, performing facial recognition of the one or more distinct features of the each of the attendees in the each of the one or more priority pairs of the prioritized attendee scan data set, from the reduced feature scan data set, in an image of a current seat extracted from the received one or more images of the target area; and based on a recognition of one of the attendees in the one or more priority pairs of the prioritized attendee scan data set occupying the current seat, performing at least one of: locking an occupancy of the current seat by the recognized one of the attendees and dynamically reducing the prioritized attendee scan data set for scanning the subsequent seat in the seat scan order based on the locked occupancy of the current seat, proceeding to scan the subsequent seat in the seat scan order, and determining an absentee in the target area;

wherein the generation and the dynamic reduction of the prioritized attendee scan data set, the dynamic configuration of the seat scan order, and the performance of rapid facial recognition using the reduced feature scan data set minimize the processing and computational requirements for determining the attendance of the target area.

2. The system according to claim 1, wherein the seat preference information comprises a name of the each of the attendees, a seat label associated with each of the seats in the target area, a number of times the each of the attendees occupies the each of the seats in the target area, a probability of the each of the attendees occupying the each of the seats in the target area, and a seating arrangement of each session in the target area.

3. The system according to claim 1, wherein the one or more modules defining the computer program instructions, which when executed by the at least one processor, cause the at least one processor to compute a deviation on the each of the seats using the seat preference information and the prioritized attendee scan data set for the dynamic configuration of the seat scan order.

4. The system according to claim 1, wherein the historical information database is configured to store profile information, historical attendance information, and the seat preference information of the each of the attendees of the target area, and images of the unoccupied seats in the target area, wherein the profile information comprises name, images with facial data, age, gender, classes, and grade of the each of the attendees.

5. The system according to claim 1, further comprising a client application deployed on a client device, wherein the client application defines computer program instructions, which when executed by at least one processor of the client device, cause the at least one processor of the client device to:

generate a unique identification code configured to facilitate determination of a preliminary attendance of the target area, wherein the unique identification code is one of a one-dimensional barcode, a two-dimensional barcode, and a three-dimensional barcode;

receive scans of the unique identification code from user devices of the attendees;

compare, in communication with the historical information database, a number of the received scans of the unique identification code with a number of the attendees registered in the target area; and activate the image capture device for capturing the images of the target area to facilitate the determination and validation of the attendance of the target area.

6. The system according to claim 1, wherein the one or more modules defining the computer program instructions, which when executed by the at least one processor, cause the at least one processor to dynamically store a seating arrangement of each session in the target area and the determined attendance of each session in the historical information database for dynamically enhancing the seat preference information and subsequent generation of the prioritized attendee scan data set for each of the seats in the target area over time.

7. The system according to claim 1, wherein the one or more modules defining the computer program instructions, which when executed by the at least one processor, cause the at least one processor to generate an attendance report comprising a seating arrangement of a session, the attendees occupying the seats, and absentees in the target area, and transmit the attendance report to an entity associated with the target area.

8. A method for performing a priority-based determination of attendance in a target area with minimized processing and computational requirements, the method employing an attendance determination system comprising a non-transitory, computer-readable storage medium and at least one processor operably coupled to the non-transitory, computer-readable storage medium, the at least one processor configured to execute computer program instructions defined by one or more modules of the attendance determination system for performing the method comprising:

dynamically generating and storing, by the attendance determination system, seat preference information of each of a plurality of attendees of the target area by performing facial recognition on images of the target area captured by an image capture device over a plurality of iterations, in communication with a historical information database; and determining, by the attendance determination system, the attendance of the target area using the dynamically generated and stored seat preference information, by:

receiving one or more images of the target area comprising a plurality of seats from the image capture device;

generating a prioritized attendee scan data set based on the seat preference information, wherein the prioritized attendee scan data set comprises one or more priority pairs of attendees frequently identified at each of the seats, and wherein the prioritized attendee scan data set is dynamically reduced based on a locked occupancy of the seats;

generating a reduced feature scan data set comprising one or more distinct features of each of the attendees in each of the one or more priority pairs of the prioritized attendee scan data set and storing the reduced feature scan data set in the historical information database;

dynamically configuring a seat scan order for scanning the seats in the target area using the seat preference information and the prioritized attendee scan data set, in communication with the historical information database; and for each of the seats in the seat scan order:
in communication with the historical information database, performing facial recognition of the one or more distinct features of the each of the attendees in the each of the one or more priority pairs of the prioritized attendee scan data set, from the reduced feature scan data set, in an image of a current seat extracted from the received one or more images of the target area; and based on a recognition of one of the attendees in the one or more priority pairs of the prioritized attendee scan data set occupying the current seat, performing at least one of: locking an occupancy of the current seat by the recognized one of the attendees and dynamically reducing the prioritized attendee scan data set for scanning the subsequent seat in the seat scan order based on the locked occupancy of the current seat, proceeding to scan the subsequent seat in the seat scan order, and determining an absentee in the target area;

wherein the generation and dynamic reduction of the prioritized attendee scan data set, the dynamic configuration of the seat scan order, and the performance of rapid facial recognition using the reduced feature scan data set minimize the processing and computational requirements for determining the attendance of the target area.

9. The method according to claim 8, wherein the seat preference information comprises a name of the each of the attendees, a seat label associated with each of the seats in the target area, a number of times the each of the attendees occupies the each of the seats in the target area, a probability of the each of the attendees occupying the each of the seats in the target area, and a seating arrangement of each session in the target area.

10. The method according to claim 8, wherein the dynamic configuration of the seat scan order comprises computing, by the attendance determination system, a deviation on the each of the seats using the seat preference information and the prioritized attendee scan data set.

11. The method according to claim 8, wherein the historical information database is configured to store profile information, historical attendance information, and the seat preference information of the each of the attendees of the target area, and images of the unoccupied seats in the target area, wherein the profile information comprises name, images with facial data, age, gender, classes, and grade of the each of the attendees.

12. The method according to claim 8, further comprising:
generating, by a client application deployed on a client device and executable by at least one processor of the client device, a unique identification code configured to facilitate determination of a preliminary attendance of the target area, wherein the unique identification code is one of a one-dimensional barcode, a two-dimensional barcode, and a three-dimensional barcode;
receiving, by the client application, scans of the unique identification code from user devices of the attendees;

comparing, by the client application, in communication with the historical information database, a number of the received scans of the unique identification code with a number of the attendees registered in the target area; and activating, by the client application, the image capture device for capturing the images of the target area to facilitate the determination and validation of the attendance of the target area.

13. The method according to claim 8, further comprising dynamically storing, by the attendance determination system, a seating arrangement of each session in the target area and the determined attendance of each session in the historical information database for dynamically enhancing the seat preference information and subsequent generation of the prioritized attendee scan data set for each of the seats in the target area over time.

14. The method according to claim 8, further comprising:
generating, by the attendance determination system, an attendance report comprising a seating arrangement of a session, the attendees occupying the seats, and absentees in the target area; and
transmitting, by the attendance determination system, the attendance report to an entity associated with the target area.

15. A non-transitory, computer-readable storage medium having embodied thereon, computer program instructions executable by at least one processor for performing a priority-based determination of attendance in a target area with minimized processing and computational requirements, the computer program instructions when executed by the at least one processor cause the at least one processor to:

dynamically generate and store seat preference information of each of a plurality of attendees of the target area by performing facial recognition on images of the target area captured by an image capture device over a plurality of iterations, in communication with a historical information database; and determine the attendance of the target area using the dynamically generated and stored seat preference information, by:
receiving one or more images of the target area comprising a plurality of seats from the image capture device;

generating a prioritized attendee scan data set based on the seat preference information, wherein the prioritized attendee scan data set comprises one or more priority pairs of attendees frequently identified at each of the seats, and wherein the prioritized attendee scan data set is dynamically reduced based on a locked occupancy of the seats;

generating a reduced feature scan data set comprising one or more distinct features of each of the attendees in each of the one or more priority pairs of the prioritized attendee scan data set and storing the reduced feature scan data set in the historical information database;

dynamically configuring a seat scan order for scanning the seats in the target area using the seat preference information and the prioritized attendee scan data set, in communication with the historical information database; and for each of the seats in the seat scan order:
in communication with the historical information database, performing facial recognition of the one or more distinct features of the each of the attendees in the each of the one or more priority pairs of the prioritized attendee scan data set, from the reduced feature scan data set, in an image of a current seat extracted from the received one or more images of the target area; and based on a recognition of one of the attendees in the one or more priority pairs of the prioritized attendee scan data set occupying the current seat, performing at least one of: locking an occupancy of the current seat by the recognized one of the attendees and dynamically reducing the prioritized attendee scan data set for scanning the subsequent seat in the seat scan order based on the locked occupancy of the current seat, proceeding to scan the subsequent seat in the seat scan order, and determining an absentee in the target area;

wherein the generation and dynamic reduction of the prioritized attendee scan data set, the dynamic configuration of the seat scan order, and the performance of rapid facial recognition using the reduced feature scan data set minimize the processing and computational requirements for determining the attendance of the target area.

16. The non-transitory, computer-readable storage medium according to claim 15, wherein the seat preference information comprises a name of the each of the attendees, a seat label associated with each of the seats in the target area, a number of times the each of the attendees occupies the each of the seats in the target area, a probability of the each of the attendees occupying the each of the seats in the target area, and a seating arrangement of each session in the target area.

17. The non-transitory, computer-readable storage medium according to claim 15, wherein the dynamic configuration of the seat scan order comprises computing a deviation on the each of the seats using the seat preference information and the prioritized attendee scan data set.

18. The non-transitory, computer-readable storage medium according to claim 15, wherein the historical information database is configured to store profile information, historical attendance information, and the seat preference information of the each of the attendees of the target area, and images of the unoccupied seats in the target area, wherein the profile information comprises name, images with facial data, age, gender, classes, and grade of the each of the attendees.

19. The non-transitory, computer-readable storage medium according to claim 15, wherein the computer program instructions when executed by the at least one processor further cause the at least one processor to dynamically store a seating arrangement of each session in the target area and the determined attendance of each session in the historical information database for dynamically enhancing the seat preference information and subsequent generation of the prioritized attendee scan data set for each of the seats in the target area over time.

20. The non-transitory, computer-readable storage medium according to claim 15, wherein the computer program instructions when executed by the at least one processor further cause the at least one processor to generate an attendance report comprising a seating arrangement of a session, the attendees occupying the seats, and absentees in the target area, and transmit the attendance report to an entity associated with the target area.

* * * * *